United States Patent
Goldstein et al.

(10) Patent No.: US 12,264,967 B2
(45) Date of Patent: Apr. 1, 2025

(54) SYSTEMS AND METHODS FOR ILLUMINATING PAINT COLOR CHIP LOCATIONS WITHIN A DISPLAY ASSEMBLY

(71) Applicant: Behr Process LLC, Santa Ana, CA (US)

(72) Inventors: Lindsey Goldstein, Aliso Viejo, CA (US); Mark Germain, Long Beach, CA (US); James Crogan, Orange, CA (US); Kevin Vandever, Huntington Beach, CA (US); Damien Reynolds, Huntington Beach, CA (US); Kevin Huljich, Aukland (NZ)

(73) Assignee: Behr Process LLC, Santa Ana, CA (US)

( * ) Notice: Subject to any disclaimer, the term of this patent is extended or adjusted under 35 U.S.C. 154(b) by 115 days.

(21) Appl. No.: 17/975,803

(22) Filed: Oct. 28, 2022

(65) Prior Publication Data

US 2023/0048923 A1 Feb. 16, 2023

Related U.S. Application Data

(63) Continuation of application No. 17/151,265, filed on Jan. 18, 2021, now Pat. No. 11,486,764, which is a (Continued)

(51) Int. Cl.
*G01J 3/46* (2006.01)
*F21S 4/28* (2016.01)
(Continued)

(52) U.S. Cl.
CPC ............... *G01J 3/463* (2013.01); *F21S 4/28* (2016.01); *G06F 3/0482* (2013.01); *G06F 16/2455* (2019.01); *F21Y 2115/10* (2016.08)

(58) Field of Classification Search
CPC .... G01J 3/463; G01J 3/526; F21S 4/28; G06F 3/0482; G06F 16/2455; F21Y 2115/10
See application file for complete search history.

(56) References Cited

U.S. PATENT DOCUMENTS 6,441,943 B1 8/2002 Roberts et al.
6,552,663 B2 4/2003 Swartzel et al.
(Continued)

FOREIGN PATENT DOCUMENTS

EP 2220965 B1 4/2018
JP 2008500705 A 1/2008
(Continued)

OTHER PUBLICATIONS

"MudGet: Reproduction of the desired lighting environment using a smart-LED," Y.H. Kim, et al., Journal of Computational Design and Engineering, Mar. 2, 2017.

*Primary Examiner* — Mohamed K Amara
(74) *Attorney, Agent, or Firm* — Harness, Dickey & Pierce, P.L.C.

(57) ABSTRACT

Systems and methods include a display assembly that displays paint color chips at paint color chip locations that each have a divider tab. A light-emitting diode (LED) control circuit is in communication with each LED of an LED array and in communication with a computing device that determines a particular paint color chip based on received input, determines a particular paint color chip location of the particular paint color chip, identifies a particular LED associated with the particular paint color chip location, and transmits an activation signal to the LED control circuit. The LED control circuit receives the activation signal and activates the particular LED to illuminate the divider tab located at the particular paint color chip location within the display assembly.

28 Claims, 33 Drawing Sheets

Related U.S. Application Data continuation of application No. 16/404,191, filed on May 6, 2019, now Pat. No. 10,900,839, application No. 17/975,803 is a continuation of application No. 17/151,248, filed on Jan. 18, 2021, now Pat. No. 11,486,763, which is a continuation of application No. 16/404,191, filed on May 6, 2019, now Pat. No. 10,900,839.

(51) Int. Cl.
*G06F 3/0482* (2013.01)
*G06F 16/2455* (2019.01)
*F21Y 115/10* (2016.01)

(56) References Cited

U.S. PATENT DOCUMENTS

| | | |
|---|---|---|
| 6,563,510 B1 | 5/2003 | Rice et al. |
| 6,631,575 B1 | 10/2003 | Voelzke et al. |
| 7,230,629 B2 | 6/2007 | Reynolds et al. |
| 7,959,320 B2 | 6/2011 | Mueller et al. |
| 9,140,436 B2 * | 9/2015 | Lu .................. F21S 8/065 |
| 9,280,227 B2 | 3/2016 | Reynolds et al. |
| 9,483,963 B2 | 11/2016 | Woelfel et al. |
| 9,563,342 B2 | 2/2017 | Reynolds et al. |
| 9,565,953 B2 | 2/2017 | Alarcon et al. |
| 9,639,983 B2 | 5/2017 | Buzyn et al. |
| 9,737,157 B2 | 8/2017 | Woelfel et al. |
| 2003/0133292 A1 | 7/2003 | Mueller et al. |
| 2003/0189829 A1 | 10/2003 | Shimizu et al. |
| 2004/0160199 A1 | 8/2004 | Morgan et al. |
| 2005/0116667 A1 * | 6/2005 | Mueller .......... H05B 45/20 315/312 |
| 2007/0200867 A1 * | 8/2007 | Reynolds ........ G06F 3/0482 345/589 |
| 2008/0094824 A1 * | 4/2008 | Stack ................ A47F 3/001 362/125 |
| 2008/0198582 A1 | 8/2008 | Cox et al. |
| 2009/0086475 A1 | 4/2009 | Caruso et al. |
| 2011/0047840 A1 | 3/2011 | Ou |
| 2012/0008318 A1 | 1/2012 | Ishiwata et al. |
| 2012/0063138 A1 | 3/2012 | Leadford et al. |
| 2012/0063159 A1 | 3/2012 | Propp |
| 2014/0254136 A1 | 9/2014 | Oraw et al. |
| 2014/0285806 A1 | 9/2014 | Haas |
| 2016/0014869 A1 * | 1/2016 | Pearson .............. F21S 2/00 362/249.05 |
| 2016/0133612 A1 | 5/2016 | Windisch et al. |
| 2016/0273741 A1 | 9/2016 | Jung |
| 2017/0097756 A1 * | 4/2017 | Buzyn ............ G06Q 30/0603 |
| 2017/0181243 A1 | 6/2017 | Weaver et al. |
| 2018/0103775 A1 | 4/2018 | Kaczmarek et al. |
| 2018/0116032 A1 * | 4/2018 | Wessel ............ F21V 23/0442 |
| 2019/0138168 A1 * | 5/2019 | Vickers ........... G06F 3/04845 |
| 2019/0208884 A1 | 7/2019 | Ortiz et al. |
| 2019/0386185 A1 | 12/2019 | Jiang et al. |
| 2019/0387875 A1 | 12/2019 | Peck et al. |
| 2020/0348803 A1 * | 11/2020 | Buzyn ............ G06Q 30/0621 |
| 2021/0112647 A1 | 4/2021 | Coleman |

FOREIGN PATENT DOCUMENTS

| | | |
|---|---|---|
| WO | WO-2006026575 A2 | 3/2006 |
| WO | WO-2015191283 A1 | 12/2015 |

* cited by examiner

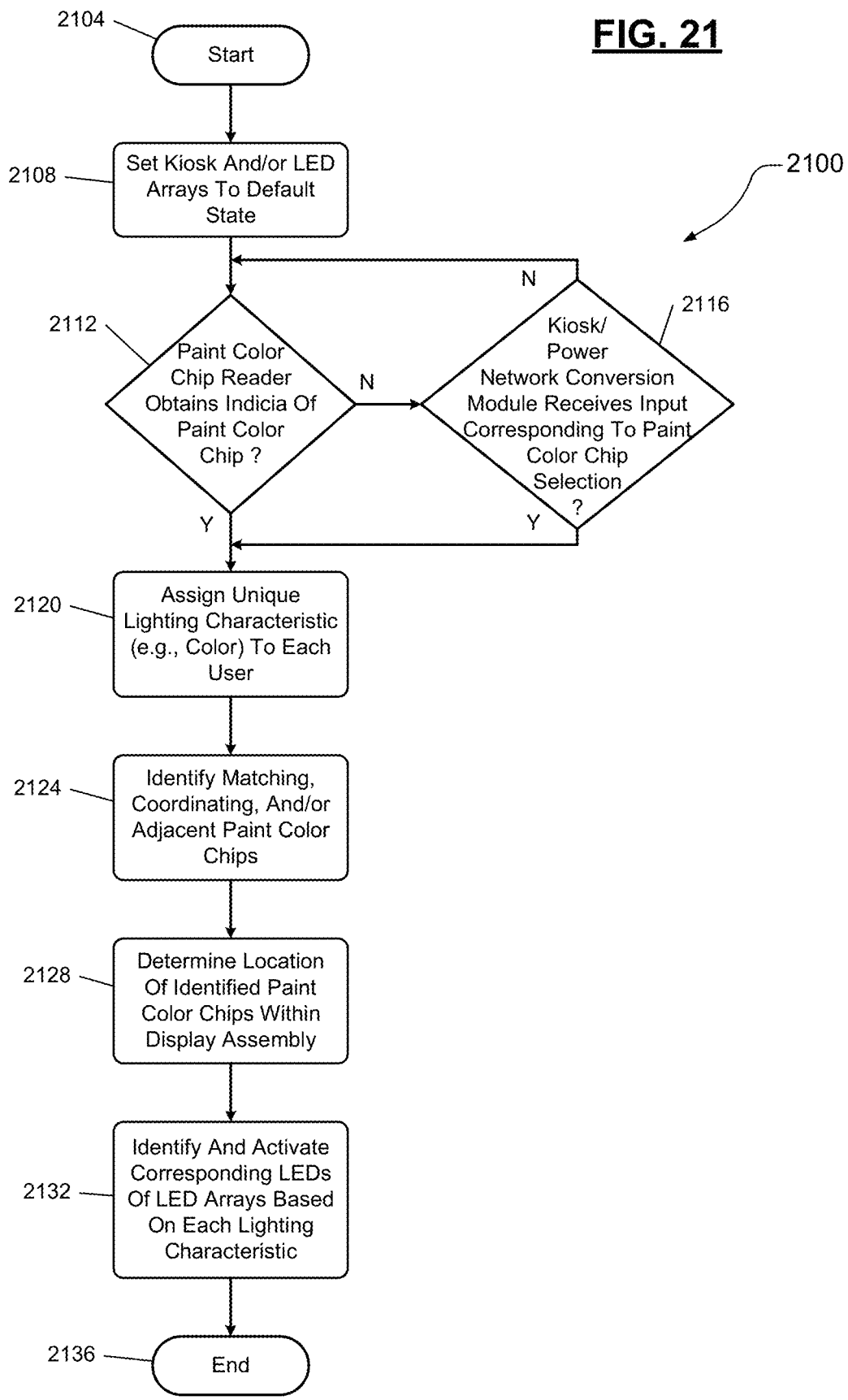

SYSTEMS AND METHODS FOR ILLUMINATING PAINT COLOR CHIP LOCATIONS WITHIN A DISPLAY ASSEMBLY

CROSS-REFERENCE TO RELATED APPLICATIONS

This application is a continuation of U.S. patent application Ser. No. 17/151,248, filed Jan. 18, 2021, and U.S. patent application Ser. No. 17/151,265, filed on Jan. 18, 2021, which are each continuations of U.S. patent application Ser. No. 16/404,191 filed on May 6, 2019. The entire disclosures of each of the above applications are incorporated herein by reference.

FIELD

The present disclosure relates to systems and method for illuminating paint color chip locations within a display assembly.

BACKGROUND

This section provides background information related to the present disclosure and is not necessarily prior art.

Consumers may visit a retail store where paint colors are selected and/or purchased. The stores may include display assemblies that include paint color chips, which are often displayed at a point-of-sale to display various paint colors that are offered by the hardware store and are each associated with a particular paint color. As an example, a display assembly may be implemented by the BEHR® Color Solutions Center at The Home Depot®. However, it may be difficult for a consumer to locate a desired paint color chip and/or locate coordinating and adjacent paint color chips within the display assembly.

SUMMARY

This section provides a general summary of the disclosure, and this section is not a comprehensive disclosure of its full scope or all of its features.

A system is disclosed and includes at least one light-emitting diode (LED) array, wherein each LED of the at least one LED array is associated with a respective paint color chip location of a display assembly; an LED control circuit in communication with each LED of the at least one LED array; and a processor configured to execute instructions stored in a nontransitory memory. The instructions include, in response to receiving an input corresponding to a selection of a first paint color chip: determining a first paint color chip location within the display assembly based on the first paint color chip; identifying an LED of the at least one LED array, wherein the LED is associated with the first paint color chip location; and transmitting an activation signal to the LED control circuit to activate the LED and illuminate the first paint color chip location within the display assembly.

In some configurations, determining the first paint color chip location within the display assembly based on the first paint color chip further comprises: identifying a matching paint color chip based on the input; and determining a location of the matching paint color chip within the display assembly.

In some configurations, determining the first paint color chip location within the display assembly based on the first paint color chip further comprises: identifying at least one coordinating paint color chip based on the input; and determining a location of the at least one coordinating paint color chip within the display assembly.

In some configurations, determining the first paint color chip location within the display assembly based on the first paint color chip further comprises: identifying at least one adjacent paint color chip based on the input; and determining a location of the at least one adjacent paint color chip within the display assembly.

In some configurations, the first paint color chip location corresponds to a location of a matching paint color chip within the display assembly; and the instructions further comprise: determining at least one additional paint color chip location within the display assembly based on the first paint color chip, wherein the at least one additional paint color chip location corresponds to a location of at least one of an adjacent paint color chip and a coordinating paint color chip; identifying at least one additional LED of the at least one LED array, wherein the at least one additional LED is associated with a location of the at least one additional paint color chip location; and transmitting the activation signal to the LED control circuit to activate the LED and the at least one additional LED.

In some configurations, the input is generated by a paint color chip reader that is configured to obtain identifying indicia associated with the first paint color chip.

In some configurations, the paint color chip reader is one of a scanner device and a camera.

In some configurations, the input is generated by a user interface element in communication with the processor.

In some configurations, the system further comprises a plurality of divider tabs, wherein: each divider tab of the plurality of divider tabs corresponds to a respective LED of the at least one LED array; and each divider tab of the plurality of divider tabs is configured to illuminate in response to the respective LED of the at least one LED array being activated.

In some configurations, a first divider tab associated with a first paint color chip location is configured to appear as a first color in response to the LED being activated, wherein the first paint color chip location corresponds to a location of a matching paint color chip within the display assembly; and a second divider tab associated with a second paint color chip location is configured to appear as a second color in response to a second LED corresponding to the second divider tab being activated, wherein the second paint color chip location corresponds to a location of one of an adjacent and a coordinating paint color chip within the display assembly.

A method is also disclosed and includes in response to a processor that is configured to execute instructions stored in a nontransitory memory receiving an input corresponding to a selection of a first paint color chip: determining, using the processor, a first paint color chip location within a display assembly based on the first paint color chip; identifying, using the processor, a light-emitting diode of at least one LED array, wherein each LED of the at least one LED array is associated with a respective paint color chip location of a display assembly, and wherein the LED is associated with the first paint color chip location; and transmitting, using the processor, an activation signal to an LED control circuit, wherein the LED control circuit is in communication with each LED of the at least one LED array, to activate the LED.

In some configurations, determining the first paint color chip location within the display assembly based on the first paint color chip further comprises: identifying a matching paint color chip based on the input; and determining a location of the matching paint color chip within the display assembly.

In some configurations, determining the first paint color chip location within the display assembly based on the first paint color chip further comprises: identifying at least one coordinating paint color chip based on the input; and determining a location of the at least one coordinating paint color chip within the display assembly.

In some configurations, determining the first paint color chip location within the display assembly based on the first paint color chip further comprises: identifying at least one adjacent paint color chip based on the input; and determining a location of the at least one adjacent paint color chip within the display assembly.

In some configurations, the first paint color chip location corresponds to a location of a matching paint color chip within the display assembly; and wherein the method further comprises: determining at least one additional paint color chip location within the display assembly based on the first paint color chip, wherein the at least one additional paint color chip location corresponds to a location of at least one of an adjacent paint color chip and a coordinating paint color chip; identifying at least one additional LED of the at least one LED array, wherein the at least one additional LED is associated with a location of the at least one additional paint color chip location; and transmitting the activation signal to the LED control circuit, wherein the activation signal is configured to cause the LED control circuit to activate the LED and the at least one additional LED.

In some configurations, receiving the input corresponding to the selection of the first paint color chip further comprises obtaining, using a paint color chip reader, identifying indicia associated with the first paint color chip.

In some configurations, the paint color chip reader is one of a scanner device and a camera.

In some configurations, receiving the input corresponding to the selection of the first paint color chip further comprises obtaining, using a user interface element in communication with the processor, the input corresponding to the selection of the first paint color chip.

In some configurations, the method further comprises illuminating a divider tab associated with the LED in response to transmitting the activation signal.

In some configurations, the method further comprises, in response to transmitting the activation signal: illuminating a first divider tab associated with the first paint color chip location, wherein the first paint color chip location corresponds to a location of a matching paint color chip within the display assembly, and wherein the first divider tab appears as a first color; and illuminating a second divider tab associated with a second paint color chip location, wherein the second paint color chip location corresponds to a location of one of an adjacent and a coordinating paint color chip within the display assembly, and wherein the second divider tab appears as a second color.

Another system is disclosed and includes at least one light-emitting diode (LED) array, wherein each LED of the at least one LED array is associated with a respective paint color chip location of a display assembly; an LED control circuit in communication with each LED of the at least one LED array; and a processor configured to execute instructions stored in a nontransitory memory, wherein the instructions include: receiving, from a first device, a first signal indicating at least one first paint color chip locations within the display assembly and corresponding to a first paint color chip; in response to receiving the first signal, determining whether a second signal is received from a second device within a threshold time, wherein the second signal indicates at least one second paint color chip locations within the display assembly and corresponds to a second paint color chip; and in response to receiving the second signal within the threshold time: assigning (i) a first lighting characteristic to the first device and (ii) a second lighting characteristic to the second device; identifying (i) a first set of LEDs of the at least one LED array, wherein the first set of LEDs is associated with the at least one first paint color chip locations and (ii) a second set of LEDs of the at least one LED array, wherein the second set of LEDs is associated with the at least one second paint color chip locations; and transmitting an activation signal to the LED control circuit, wherein the activation signal is configured to cause the LED control circuit to activate (i) the first set of LEDs based on the first lighting characteristic and (ii) the second set of LEDs based on the second lighting characteristic.

In some configurations, the instructions further comprise: initiating a timer in response to receiving the first signal; and determining whether the second signal is received within the threshold time includes: determining a value of the timer when the second signal is received; comparing the value of the timer to a threshold value; and determining the second signal is received within the threshold time in response to the value of the timer being less than the threshold value.

In some configurations, the instructions further comprise: declaring a presence of multiple user devices in response to receiving the second signal within the threshold time; and declaring a presence of only one user device in response to not receiving the second signal within the threshold time.

In some configurations, the first lighting characteristic is at least one of a first brightness, a first color, a first intensity, and a first on-duration of an LED; and the second lighting characteristic is at least one of a second brightness, a second color, a second intensity, and a second on-duration of an LED.

In some configurations, the first device includes a first processor configured to execute first instructions stored in a first nontransitory memory, and wherein the first instructions include: identifying at least one of a matching paint color chip, an adjacent paint color chip, and a coordinating paint color chip based on an input corresponding to a selection of the first paint color chip; determining the at least one first paint color chip locations based on at least one of the matching paint color chip, the adjacent paint color chip, and the coordinating paint color chip; and generating the first signal indicating the at least one first paint color chip locations within the display assembly and corresponding to the first paint color chip.

In some configurations, the input is generated by a paint color chip reader of the first device; the paint color chip reader of the first device is configured to obtain identifying indicia associated with the first paint color chip; and the paint color chip reader of the first device is one of a scanner device and a camera.

In some configurations, the second device includes a second processor configured to execute second instructions stored in a second nontransitory memory, and wherein the second instructions include: identifying at least one of a matching paint color chip, an adjacent paint color chip, and a coordinating paint color chip based on an input corresponding to a selection of the second paint color chip; determining the at least one second paint color chip locations based on at least one of the matching paint color chip, the adjacent paint color chip, and the coordinating paint color chip; and generating the second signal indicating the at least one second paint color chip locations within the display assembly and corresponding to the second paint color chip.

In some configurations, the input is generated by a paint color chip reader of the second device; the paint color chip reader of the second device is configured to obtain identifying indicia associated with the second paint color chip; and the paint color chip reader of the second device is one of a scanner device and a camera.

In some configurations, the system further comprises a plurality of divider tabs, wherein: each divider tab of the plurality of divider tabs corresponds to a respective LED of the at least one LED array; and each divider tab of the plurality of divider tabs is configured to illuminate in response to the respective LED of the at least one LED array being activated.

In some configurations, each divider tab of the plurality of divider tabs is configured to illuminate based on a lighting characteristic associated with the respective LED.

Another method is disclosed and includes receiving, from a first device and using a processor that is configured to execute instructions stored in a nontransitory memory, a first signal indicating at least one first paint color chip locations within a display assembly and corresponding to a first paint color chip; in response to receiving the first signal, determining whether a second signal is received from a second device within a threshold time, wherein the second signal indicates at least one second paint color chip locations within the display assembly and corresponds to a second paint color chip; and in response to receiving the second signal within the threshold time: assigning, using the processor, (i) a first lighting characteristic to the first device and (ii) a second lighting characteristic to the second device; identifying, using the processor, (i) a first set of LEDs of at least one LED array, wherein the first set of LEDs is associated with the at least one first paint color chip locations and (ii) a second set of LEDs of the at least one LED array, wherein the second set of LEDs is associated with the at least one second paint color chip locations; and transmitting, using the processor, an activation signal to an LED control circuit, wherein the activation signal is configured to cause the LED control circuit to activate (i) the first set of LEDs based on the first lighting characteristic and (ii) the second set of LEDs based on the second lighting characteristic.

In some configurations, the method further comprises initiating, using the processor, a timer in response to receiving the first signal; and determining, using the processor, whether the second signal is received within the threshold time includes: determining, using the processor, a value of the timer when the second signal is received; comparing, using the processor, the value of the timer to a threshold value; and determining, using the processor, the second signal is received within the threshold time in response to the value of the timer being less than the threshold value.

In some configurations, the method further comprises declaring, using the processor, a presence of multiple user devices in response to receiving the second signal within the threshold time; and declaring, using the processor, a presence of only one user device in response to not receiving the second signal within the threshold time.

In some configurations, the first lighting characteristic is at least one of a first brightness, a first color, a first intensity, and a first on-duration of an LED; and the second lighting characteristic is at least one of a second brightness, a second color, a second intensity, and a second on-duration of an LED.

In some configurations, the method further comprises identifying, using a first processor of the first device, at least one of a matching paint color chip, an adjacent paint color chip, and a coordinating paint color chip based on an input corresponding to a selection of the first paint color chip; determining, using the first processor, the at least one first paint color chip locations based on at least one of the matching paint color chip, the adjacent paint color chip, and the coordinating paint color chip; and generating, using the first processor, the first signal indicating the at least one first paint color chip locations within the display assembly and corresponding to the first paint color chip, wherein the first processor is configured to execute instructions stored in a first nontransitory memory of the first device.

In some configurations, the method further comprises generating, using the first processor, the input using a paint color chip reader of the first device, wherein the paint color chip reader of the first device is configured to obtain identifying indicia associated with the first paint color chip; and the paint color chip reader of the first device is one of a scanner device and a camera.

In some configurations, the method further comprises identifying, using a second processor of the second device, at least one of a matching paint color chip, an adjacent paint color chip, and a coordinating paint color chip based on an input corresponding to a selection of the second paint color chip; determining, using the second processor, the at least one second paint color chip locations based on at least one of the matching paint color chip, the adjacent paint color chip, and the coordinating paint color chip; and generating, using the second processor, the second signal indicating the at least one second paint color chip locations within the display assembly and corresponding to the second paint color chip, wherein the second processor is configured to execute instructions stored in a second nontransitory memory of the second device.

In some configurations, the method further comprises generating, using the second processor, the input using a paint color chip reader of the second device, wherein the paint color chip reader of the second device is configured to obtain identifying indicia associated with the first paint color chip; and the paint color chip reader of the second device is one of a scanner device and a camera.

In some configurations, the method further comprises illuminating, using the processor and in response to transmitting the activation signal, at least one divider tab of the display assembly, wherein each of the at least one divider tab corresponds to a respective LED of the at least one LED array.

In some configurations, the method further comprises illuminating, using the processor and in response to transmitting the activation signal, each of the at least one divider tab is based on a lighting characteristic associated with the respective LED.

Another system is disclosed and includes a shelving mechanism having a first surface, a second surface, a tab channel that is adjacent to the second surface, and a pair of supports, wherein: the pair of supports is disposed between an opening defined by the first surface and the second surface; the tab channel is defined by a first tab surface and a second tab surface; the first tab surface and the second tab surface are nonparallel to the second surface; and the first tab surface includes a first locking portion and the second tab surface includes a second locking portion; a light-emitting diode (LED) array slidably disposed on the pair of supports; and a divider tab snapping into engagement with the tab channel, wherein: the divider tab is configured to illuminate in response to receiving light from the LED array.

In some configurations, the first locking portion snaps into engagement with a second slot of the divider tab; and the second locking portion snaps into engagement with a second slot of the divider tab.

In some configurations, the first locking portion and the second locking portion of the second tab surface are configured to prevent the divider tab from being removed from a display assembly.

In some configurations, the system further comprises a set of retaining panels disposed on the first surface, wherein the set of retaining panels are configured to retain a paint color chip.

In some configurations, the shelving mechanism includes a stop portion that is configured to prevent the LED array from moving in an upward direction.

In some configurations, the stop portion is perpendicular to the second surface.

In some configurations, the system further comprises a cover disposed over the opening, wherein the cover is configured to conceal the opening.

In some configurations, the LED array includes a handle.

In some configurations, the shelving mechanism is coupled to a display assembly using at least one fastening device.

In some configurations, the at least one fastening device is implemented by a plurality of cascaded rod structures.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIGS. 19-21 are flowcharts illustrating example control algorithms according to the present disclosure.

Corresponding reference numerals indicate corresponding parts throughout the several views of the drawings.

DETAILED DESCRIPTION

Example embodiments will now be described more fully with reference to the accompanying drawings.

Figure 1:
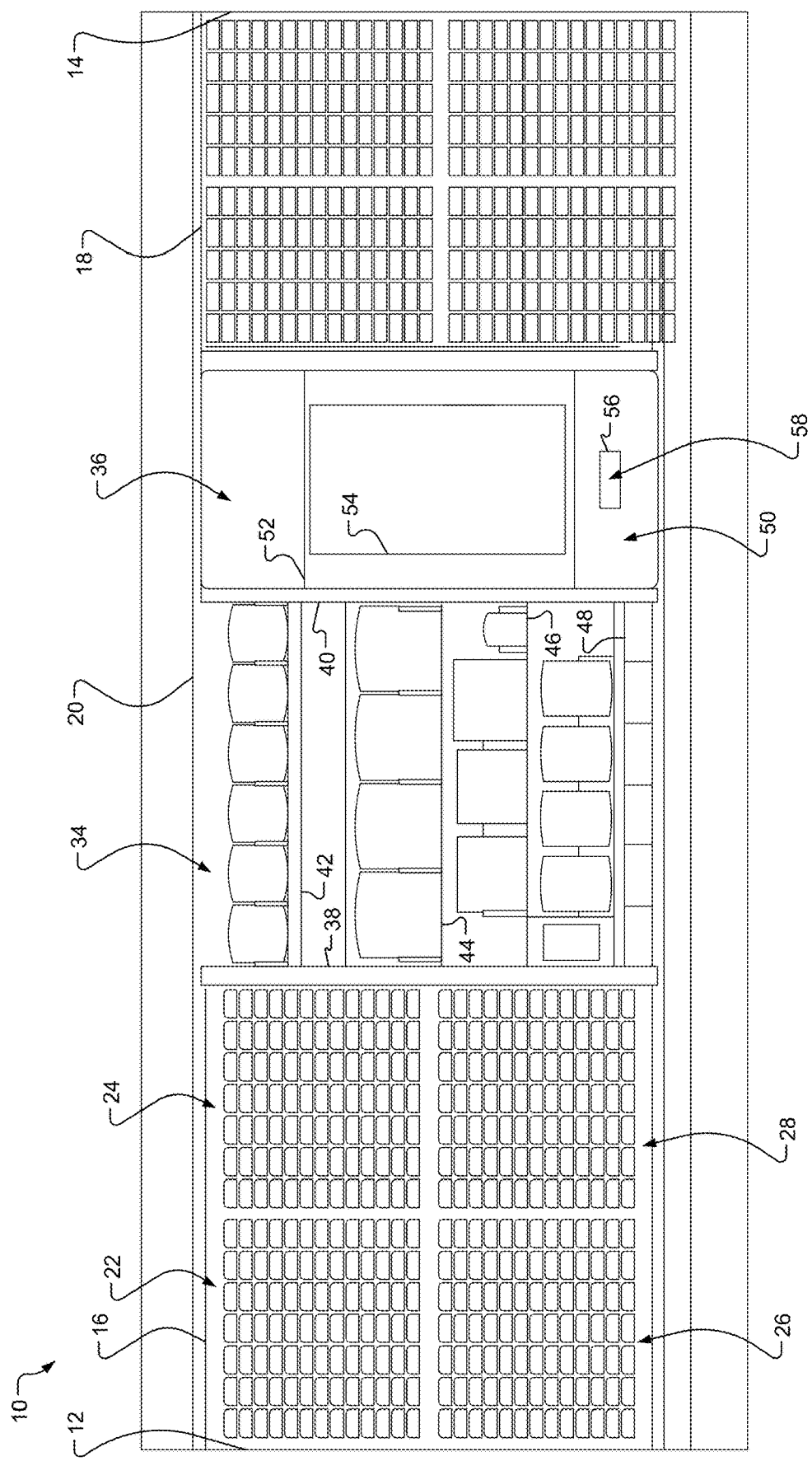
FIGS. 1 and 2A are front-views of an example display assembly according to the present disclosure.
Figure 2A:
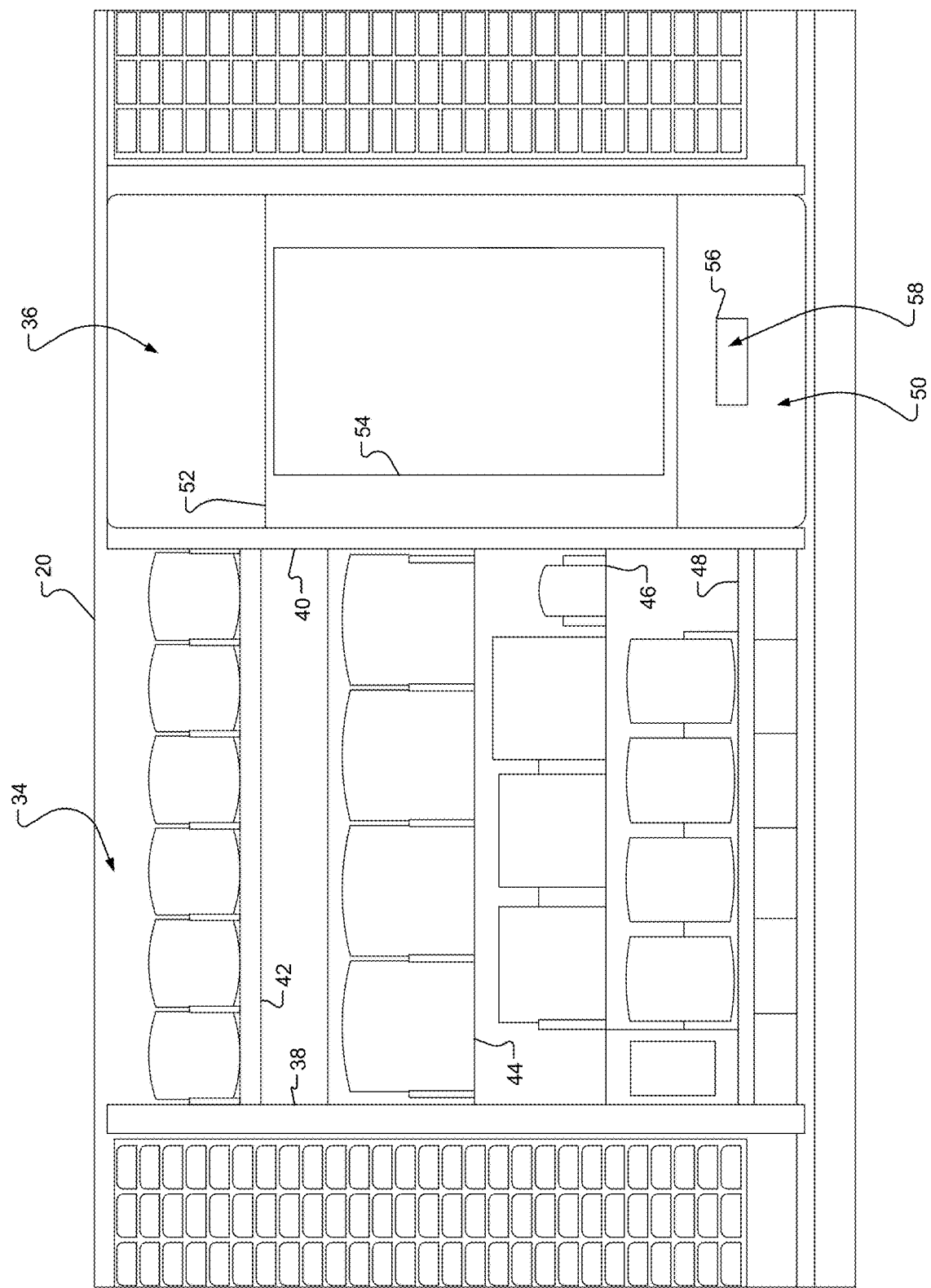
Figure 2B:
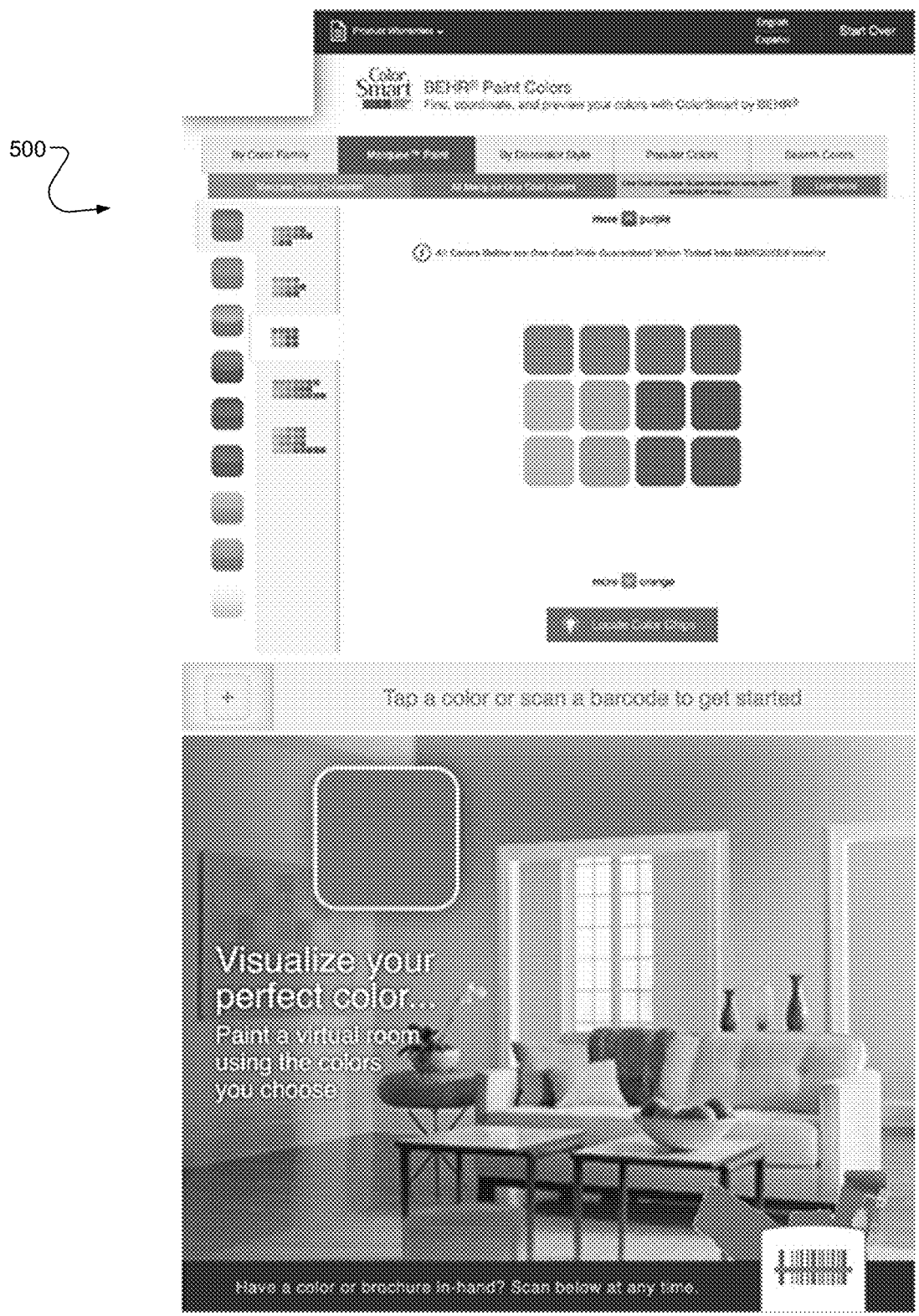
FIGS. 2B-2F are screenshots of a kiosk or computing device according to the present disclosure.
Figure 2C:
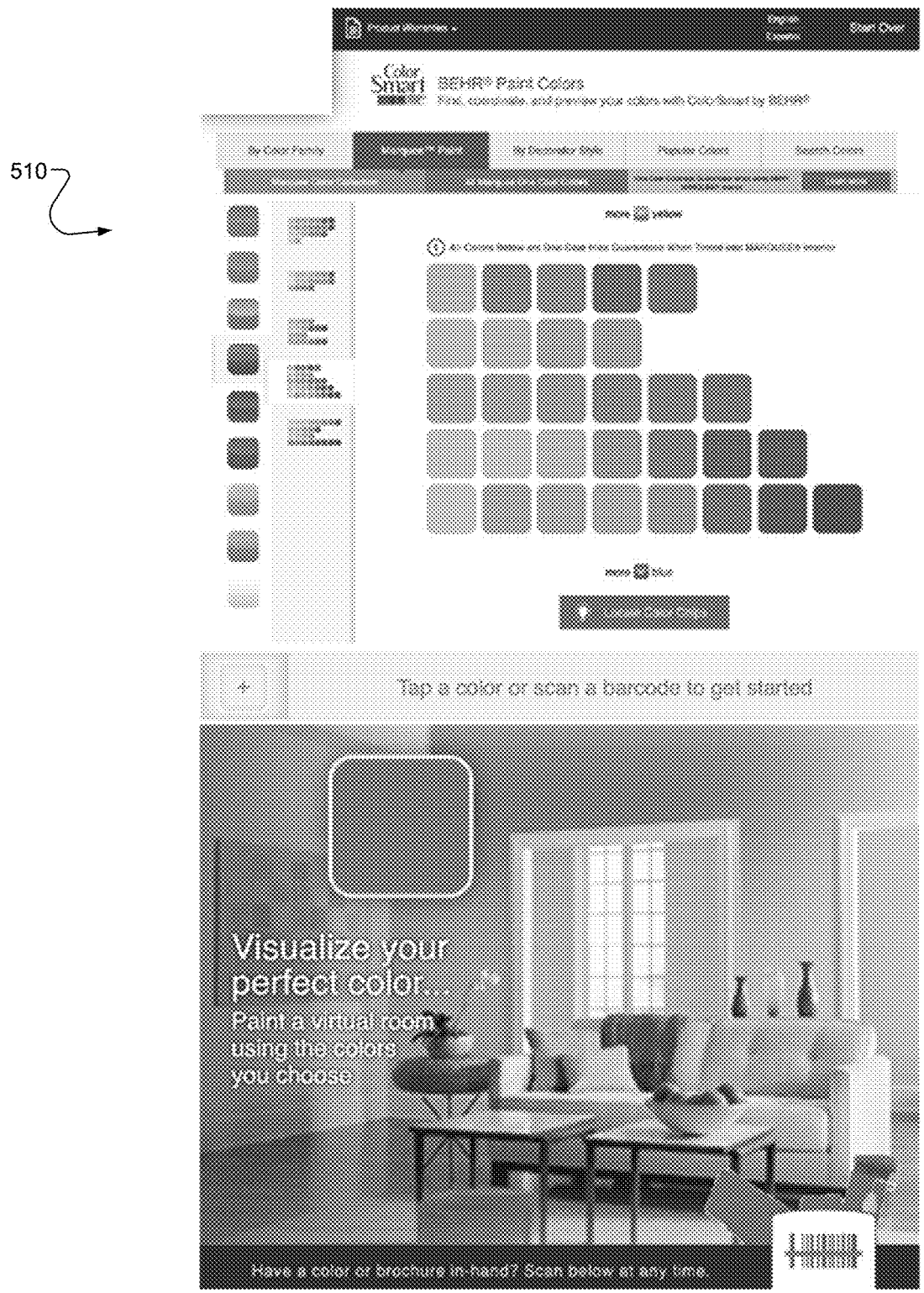
Figure 2D:
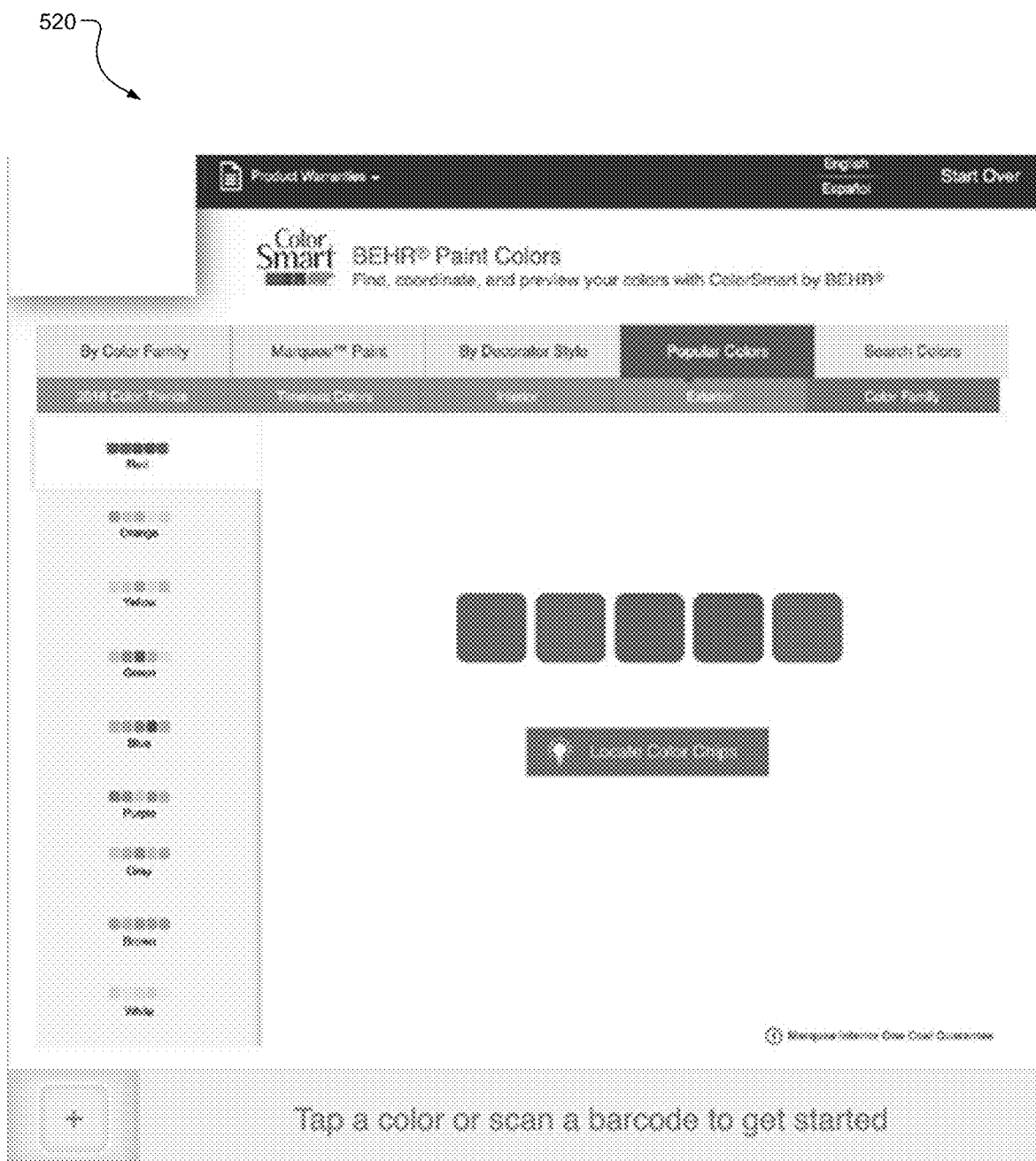
Figure 2E:
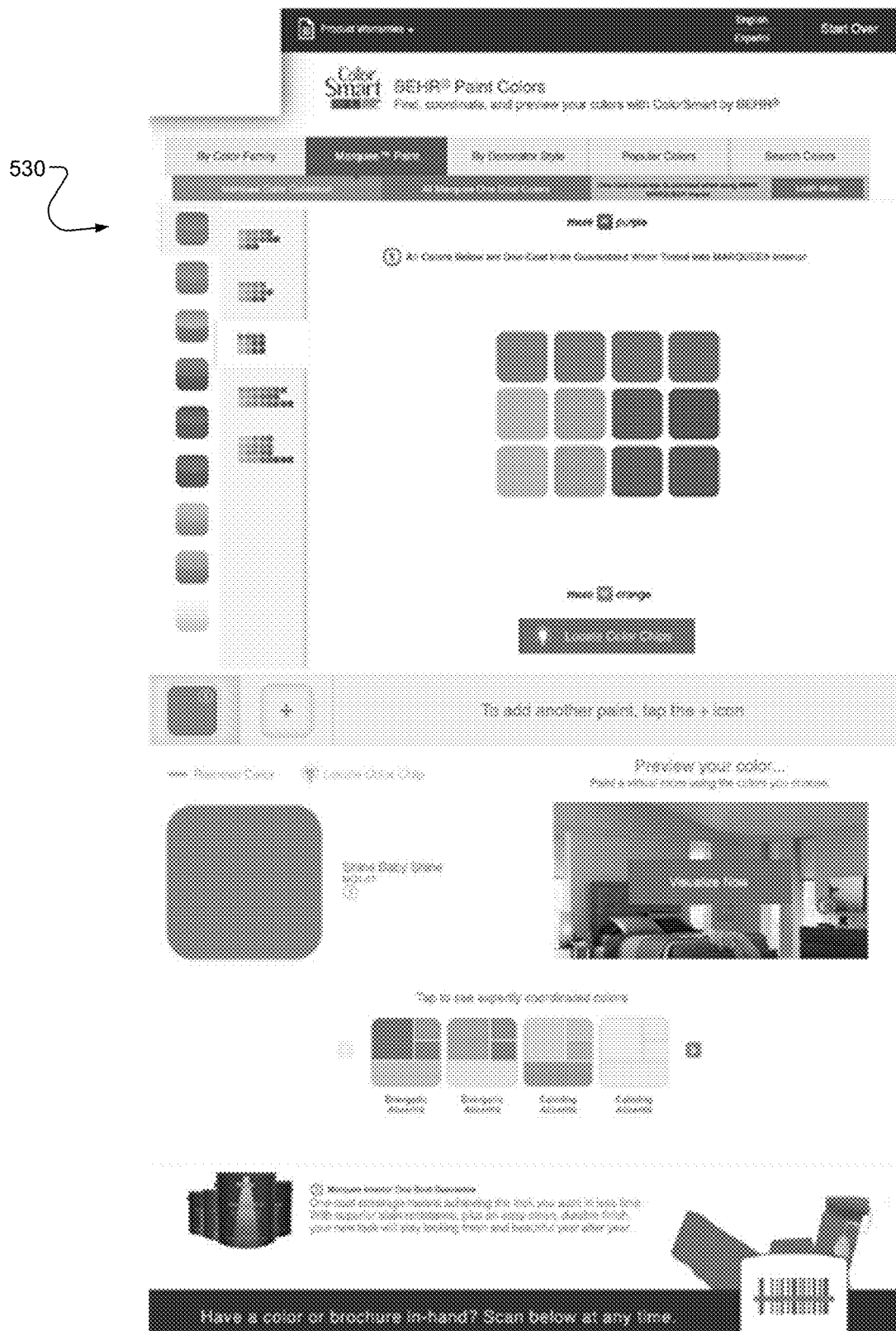
Figure 2F:
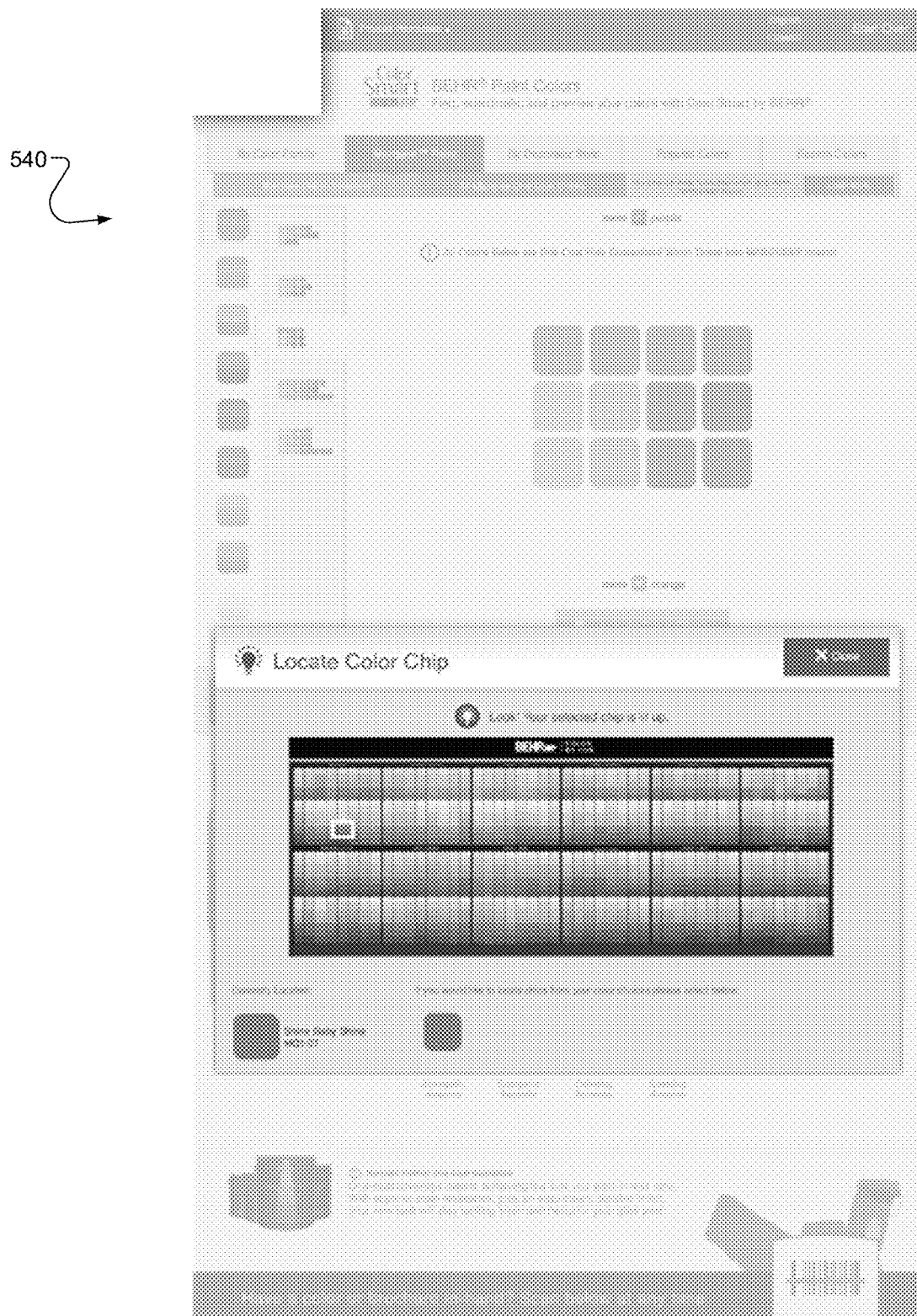

With reference to FIGS. 1-2A, an example illustration of a display assembly 10 is shown. The display assembly 10 includes a pair of side panels 12, 14. As an example, the pair of side panels 12, 14 may have a rectangular geometry or any other suitable geometry that may be utilized in a retail or other similar environment.

The display assembly 10 may also include paint color chip sections 16, 18 and a central section 20. In one embodiment, the paint color chip sections 16, 18 display a plurality of paint color chips. Furthermore, the plurality of paint color chips may be arranged in a manner that enables a user to readily identify and locate particular paint color chips. As an example, paint color chip section 16 may include subsections 22, 24, 26, 28, and each of the subsections may be associated with a particular hue, tint, shade, intensity/saturation, luminosity, etc. (e.g., subsection 22 may correspond to purple paint color chips, and the paint color chips are arranged in a vertically descending/ascending order from a lightest shade to a darkest shade of purple).

In one embodiment, the central section 20 includes an informational section 34 and a kiosk section 36. The informational section 34 includes a pair of panels 38, 40 and a plurality of shelves 42, 44, 46, 48 disposed therebetween. The plurality of shelves 42, 44, 46, 48 provides a structure for hosting brochures, pamphlets, paint color chips, or other similar types of graphical presentation elements that may assist a user in selecting a paint color chip. As an example, the graphical presentation elements may include information corresponding to popular paint colors, seasonal paint colors, and other types of similar information.

The kiosk section 36 may include a kiosk 50 and a kiosk protective cover 52. In one embodiment, the kiosk 50 includes a display 54 (e.g., a capacitive touchscreen display) that is configured to provide graphical user interface (GUI) elements in order to enable a user to, for example, interact with the kiosk 50 by touching the display 54. Additionally or alternatively, the kiosk 50 may include a plurality of user interface (UI) elements, such as buttons, a keyboard, a mouse, etc., that enable the user to interact with the kiosk 50. Using one of the GUI and the UI elements, a user may generate an input corresponding to a selection of a particular paint color chip. In response to receiving an input corresponding to a selection of the paint color chip, the kiosk 50 is configured to determine a location of the paint color chip within the display assembly 10 and indicate the location of the paint color chip within the display assembly 10 to the user, as described below in further detail and as illustrated in screenshots 500, 510, 520, 530, 540 in FIGS. 2B-2F.

Furthermore, the kiosk 50 may include a paint color chip reader 56 that is configured to capture identifying indicia from a paint color chip. As an example, the paint color chip reader 56 is implemented by an optical bar code scanner that is configured to read a bar code disposed on the paint color chip. As another example, the paint color chip reader 56 is implemented by a QR code scanner that is configured to read a QR code disposed on the paint color chip. As another example, the paint color chip reader 56 is implemented by a camera that is configured to capture an image of the paint color chip. In response to the paint color chip reader 56 capturing the identifying indicia from the paint color chip, the kiosk 50 is configured to identify the particular paint color chip, determine a location of the paint color chip within the display assembly 10, and indicate the location of the paint color chip within the display assembly 10 to the user, as described below in further detail.

The kiosk protective cover 52 is disposed over the kiosk 50 and conceals and protects various components of the kiosk 50. Furthermore, the kiosk protective cover 52 may include an opening 58 that enables a user to interact with the paint color chip reader 56, as described above. As an example, the geometry of the opening may correspond to the geometry of the paint color chips in order to enable a user to readily and efficiently insert and remove paint color chips from the paint color chip reader 56. Further, the kiosk protective cover 52 may include text and/or graphics that assist users with operating the kiosk 50 and/or the paint color chip reader 56 (e.g., the text "Start Here") and for brand identification.

While this embodiment describes the central section 20 including the kiosk 50, it is understood that the central section 20 may include or may communicate with additional or alternative computing devices to perform the functions described herein, such as a PC, a laptop, a tablet device, a smartphone, and other similar computing devices.

Figure 2G:
FIG. 2G is a front-view of an example informational section of the display assembly according to the present disclosure.

With reference to FIG. 2G, an illustration of an example informational section 34 of the display assembly 10 is shown.

Figure 3:
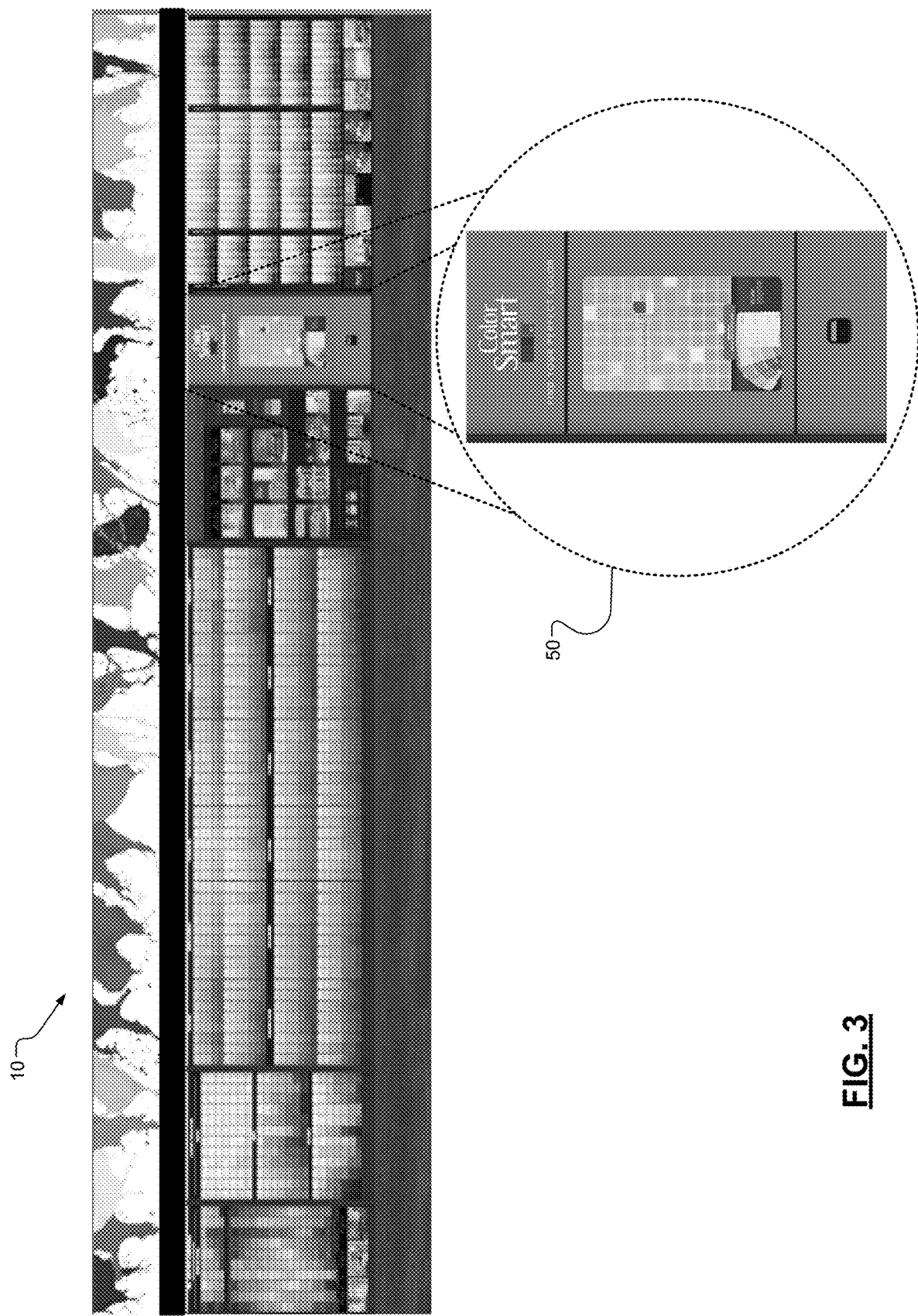
FIG. 3 is a front-view of an example display assembly according to the present disclosure.

With reference to FIG. 3, another example of the display assembly 10 is shown.

Figure 4:
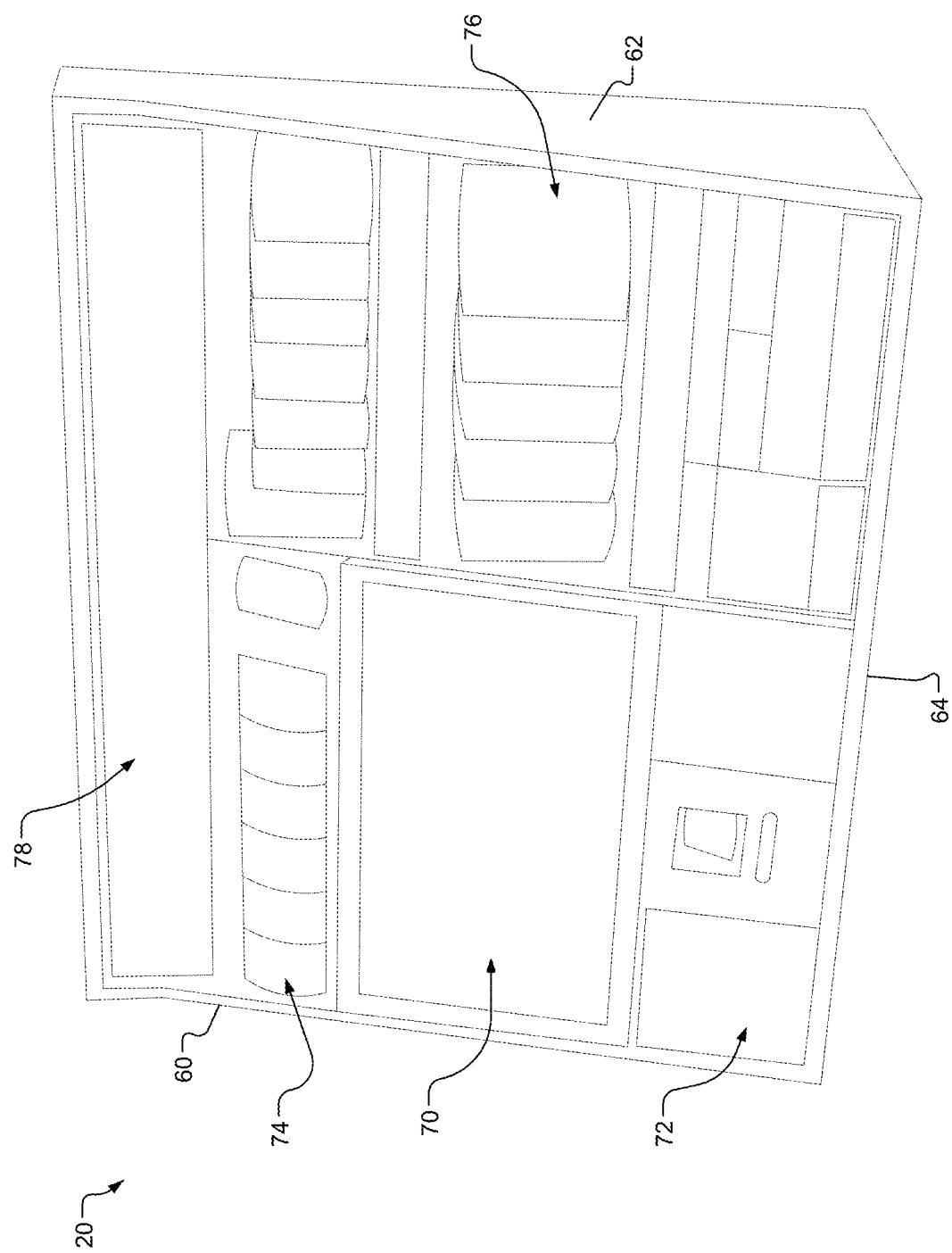
FIG. 4 is a detailed illustration of a central section of the display assembly according to the present disclosure.
Figure 5:
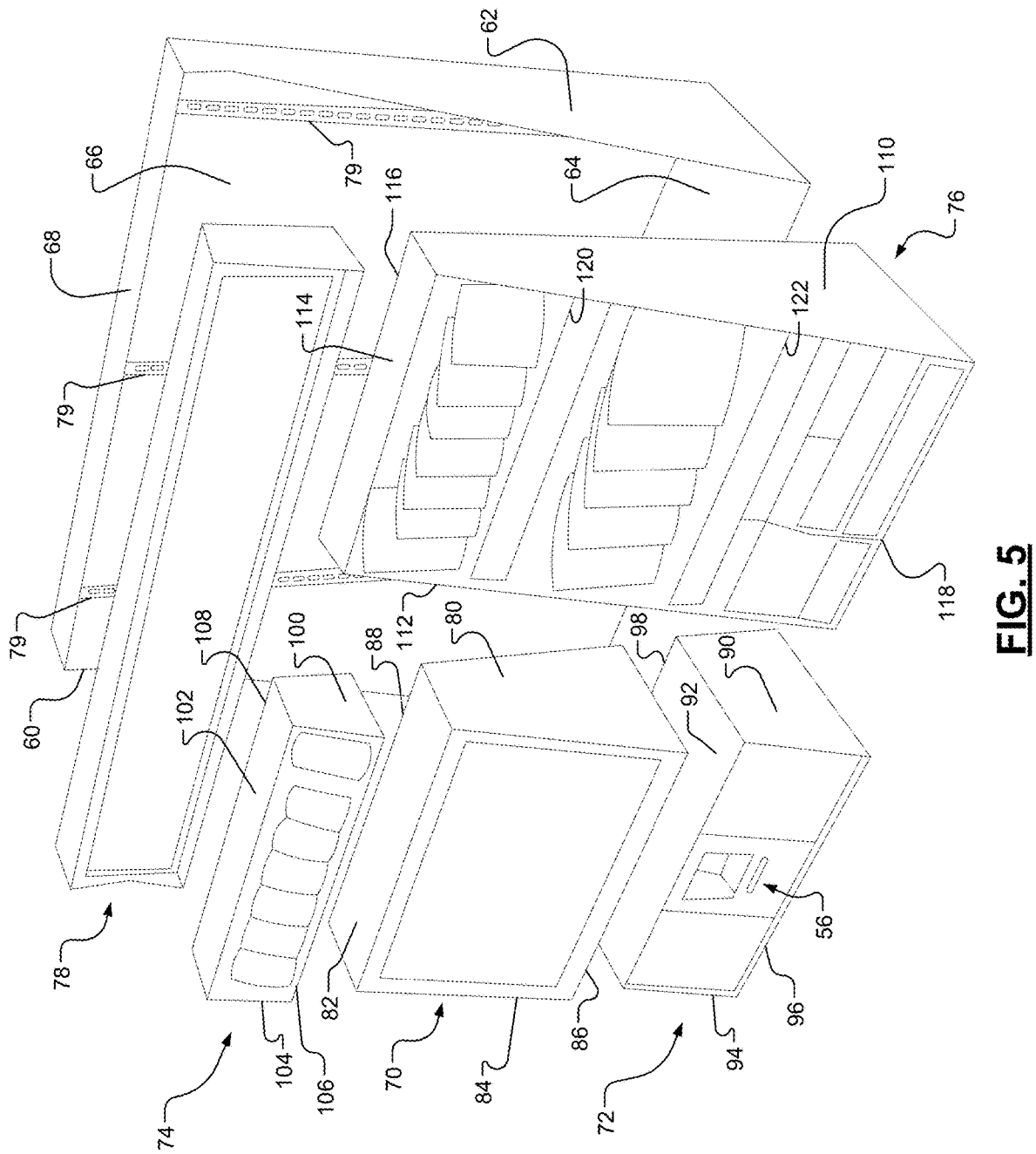
FIG. 5 is an exploded view of the central section of the display assembly according to the present disclosure.
Figure 6:
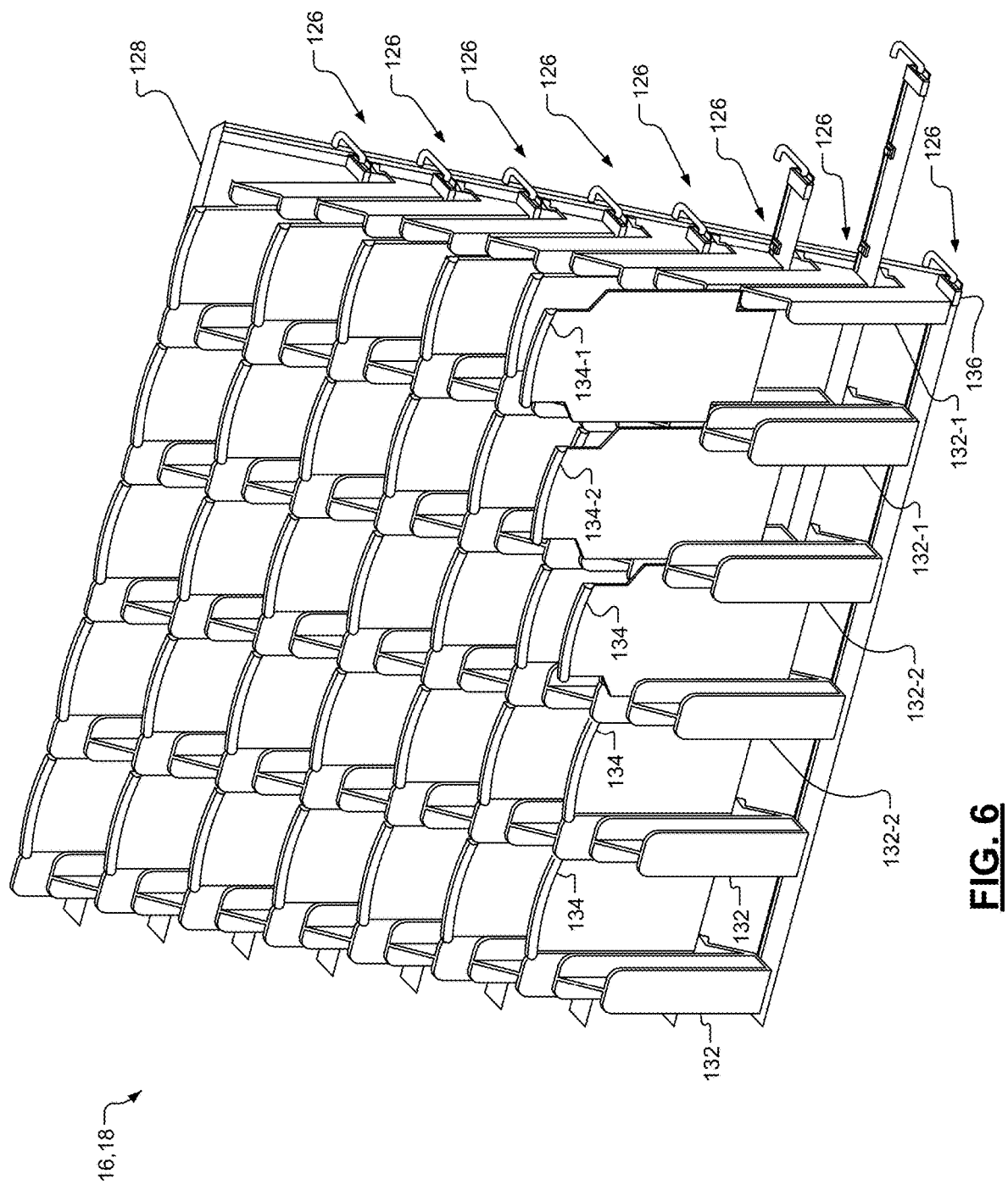
FIGS. 6-9 are detailed illustrations of the paint color chip sections of the display assembly according to the present disclosure.
Figure 7:
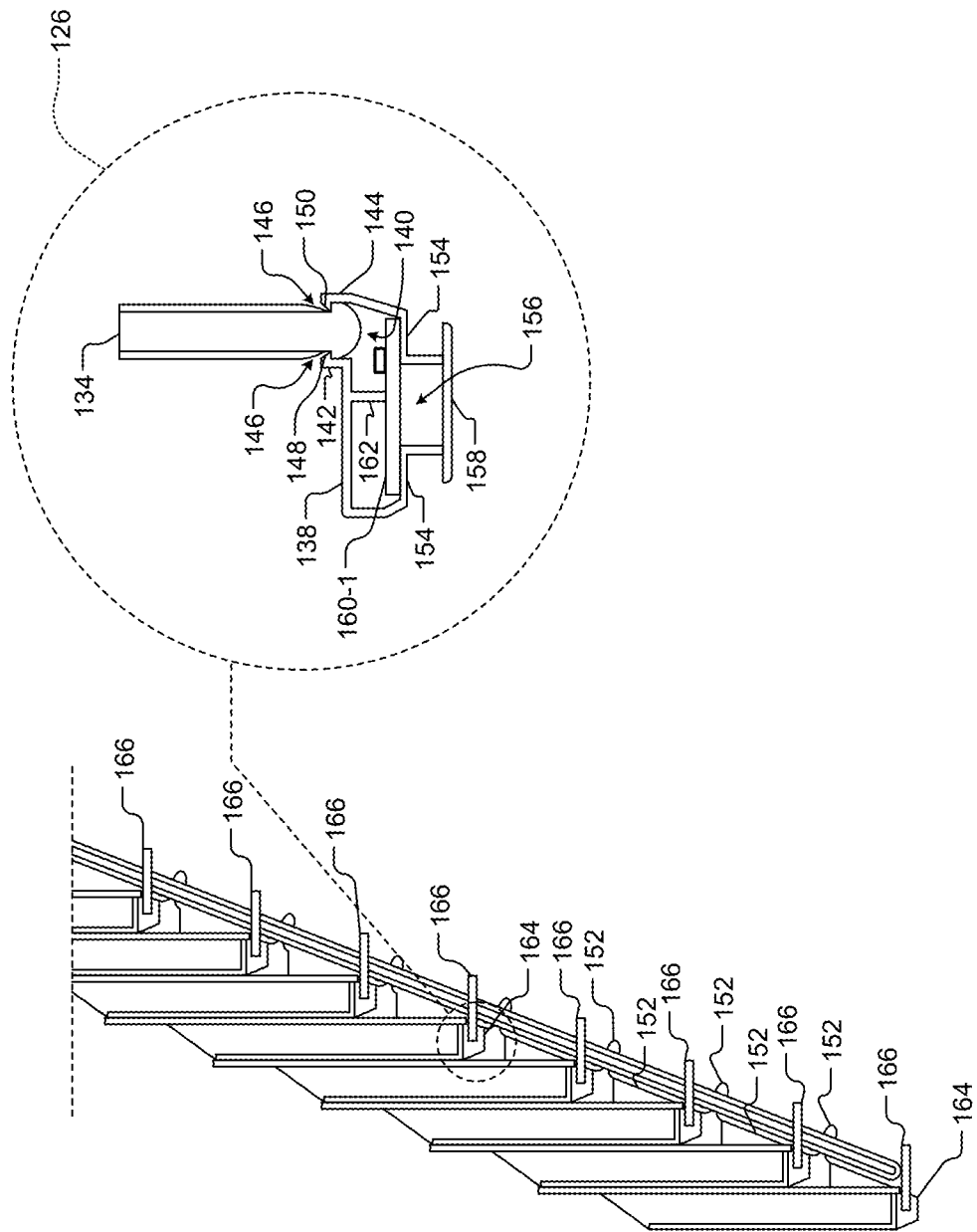
Figure 8:
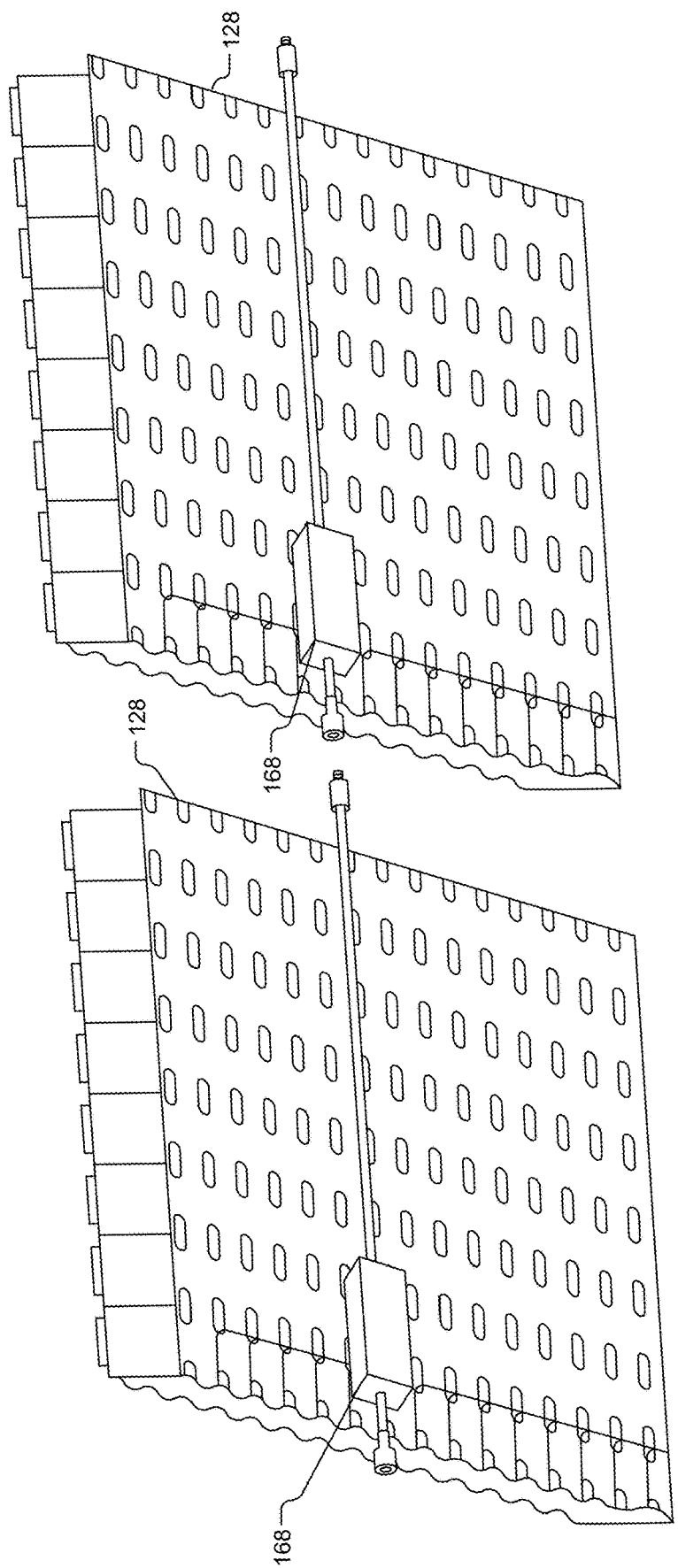
Figure 9:
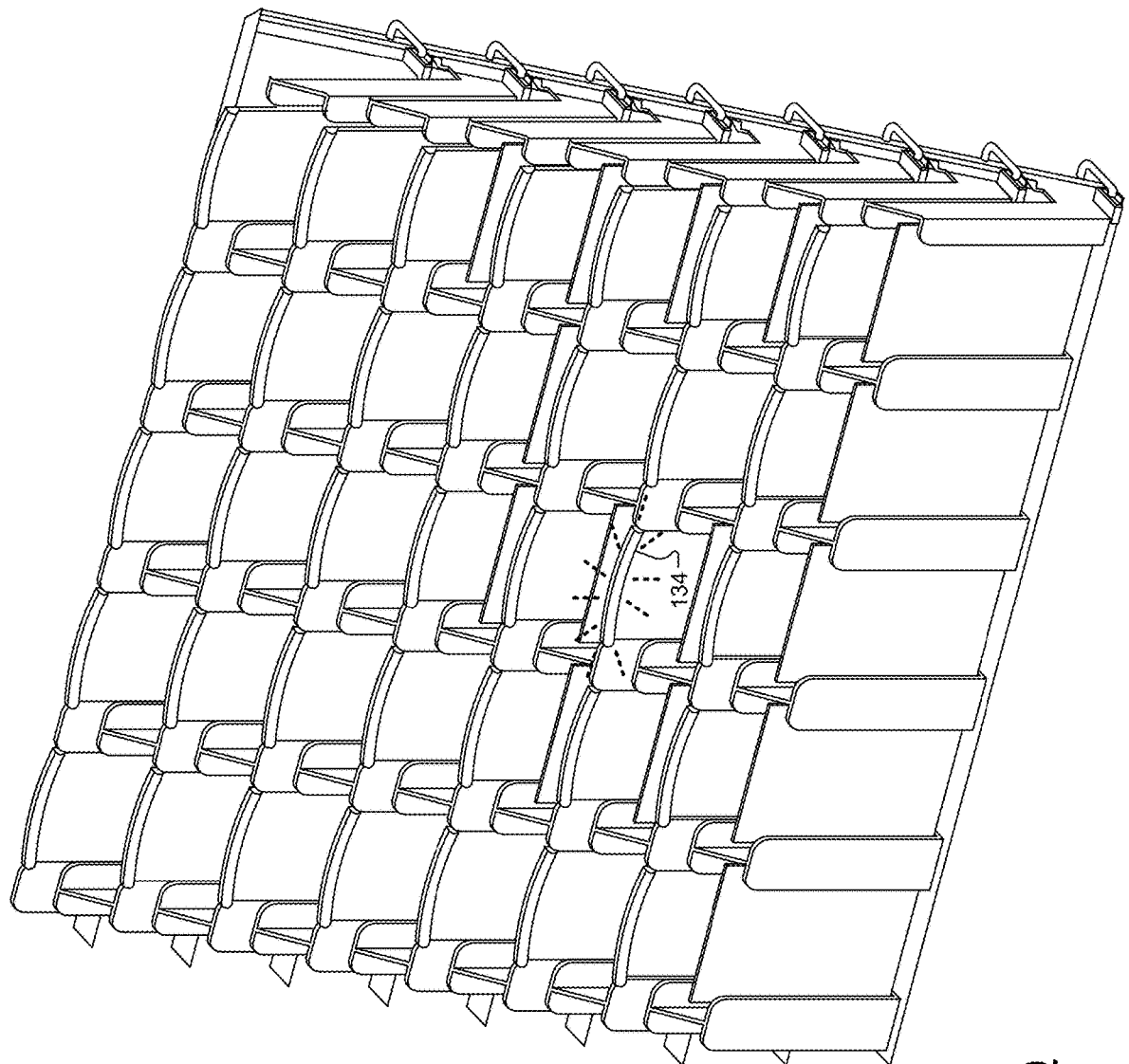

With reference to FIGS. 4-5, another example central section 20 is illustrated. In this embodiment, the central section 20 includes panels 60, 62, 64, 66, 68, a kiosk section 70, display sections 72, 74, a graphical presentation element section 76, and a header section 78.

The panels 60, 62, 64, 66, 68 are joined together in order to define the frame of the central section 20. The panels 60, 62, 64, 66, 68 may be joined using any suitable attachment and/or adhesive materials. Furthermore, panel 68 may include attachment rails 79 that enable the kiosk section 70, display sections 72, 74, the graphical presentation element section 76, and the header section 78 to attach (e.g., snap and engage) to the central section 20. While panels 60, 62 are illustrated as having nonrectangular geometries, in other embodiments, the pair of panels 60, 62 may have rectangular geometries.

The kiosk section 70 includes panels 80, 82, 84, 86, 88 in order to provide a housing for the display of the kiosk 50 and/or the kiosk 50. The panels 80, 82, 84, 86, 88 may be joined using any suitable attachment and/or adhesive materials. The display sections 72, 74, include panels 90, 92, 94, 96, 98 and panels 100, 102, 104, 106, 108, respectively, in order to provide a housing for the paint color chip reader 56 and to host various display materials, such as featured paint color chips and other graphical materials. The panels 90, 92, 94, 96, 98 and the panels 100, 102, 104, 106, 108 may be joined using any suitable attachment and/or adhesive materials.

Similar to the embodiment described above, the graphical presentation element section 76 includes panels 110, 112, 114, 116, 118 and a plurality of shelves 120, 122, disposed between panels 110 and 112. The plurality of shelves 120, 122, provides a structure for hosting brochures, pamphlets, paint color chips, or other similar types of graphical presentation elements that may assist a user in selecting a paint color chip.

With reference to FIGS. 6-9, detailed illustrations of the paint color chip sections 16, 18 are shown. The paint color chip sections 16, 18 may each include a plurality of shelving units 126 that are coupled to a respective display panel 128 of the paint color chip sections 16, 18. Each of the shelving units 126 may include a plurality of retaining panels 132, a plurality of divider tabs 134, and a shelving mechanism 136.

The retaining panels 132 are configured to structurally support and retain a plurality of paint color chips. As an example, a first set of retaining panels 132-1 are configured to structurally support and retain a plurality of paint color chips having a first color, a second set of set of retaining panels 132-2 are configured to structurally support and retain a plurality of paint color chips having a second color, and so on. Each set of retaining panels 132 of is disposed on and physically coupled to a panel surface 138 of the shelving mechanism 136. As an example, each set of retaining panels 132 may be physically coupled to the panel surface 138 using an adhesive material (e.g., a glue), a fastening material (e.g., a screw and/or clip), and/or other coupling methods (e.g., snapping the retaining panels 132 into a pair of slots of the panel surface 138 (not shown)).

Each of the divider tabs 134 is associated with a respective color of the paint color chip. As an example, a first divider tab 134-1 is associated with a plurality of paint color chips having a first color, a second divider tab 134-2 is associated with a plurality of paint color chips having a second color, and so on. Each divider tab 134 is disposed within a tab channel 140 of the shelving mechanism 136, which is defined by at least a first tab surface 142 and a second tab surface 144. Specifically, the divider tab 134 may include a pair of slots 146 that are configured to snap into engagement with a first locking tab 148 of the first tab surface 142 and a second locking tab 150 of the second tab surface 144. Accordingly, a user may easily insert the divider tab 134 into the shelving mechanism 136 and simultaneously be unable to inadvertently remove the divider tab 134 when, for example, attempting to remove a paint color chip.

The shelving mechanism 136 may extend along the width of the respective shelving unit 126. Additionally, each of the shelving mechanisms 136 may be physically coupled to the display panel 128 via a plurality of fastening devices 152. As an example, the plurality of fastening devices 152 may be implemented by multiple cascaded rod structures that are joined at respective curved portions of the rod structures, and the plurality of fastening device 152 may be partially disposed within multiple apertures of the display panel 128. In other embodiments, the fastening device 152 may be implemented by clips, screws, or other similar fastening mechanism.

The shelving mechanism 136 may include a pair of supports 154 disposed between an opening 156 defined by the panel surface 138 and a bottom surface 158 Furthermore, a first light-emitting diode (LED) array 160-1 of a plurality of LED arrays 160 may be slidably disposed within the opening 156 and supported by the pair of supports 154. With the present disclosure describes the use of LED arrays for illuminating paint color chip locations within a display assembly, other light sources, such as other light sources utilizing light guides, may be used. A stop portion 162 of the shelving mechanism 136 prevents the LED array 160-1 from moving an upward direction within the opening 156.

Each of the shelving units 126 may include a respective cover 164 that conceals the opening 156 of the respective shelving mechanism 136. In one embodiment, the cover 164 may snap into engagement with the opening 156 of the shelving mechanism 136. Additionally, each of the LED arrays 160 may include a handle 166 that enables a user to easily insert the LED array 160 into the respective opening 156 of the shelving mechanism 136. Likewise, the handle 166 enables a user to easily remove the LED array 160 from the respective opening 156 of the shelving mechanism 136.

Each of the LED arrays 160 may be electrically coupled to each other via one or more connector devices 168, which enable the LED arrays 160 to be connected in parallel to a power source (not shown) and an LED control module (shown below). Furthermore, in response to receiving a signal from the LED control module, at least one of the LEDs of the plurality of LED arrays 160 are activated and emit light. The emitted light may contact an associated divider tab 134, which is configured to illuminate in response to receiving the emitted light, as illustrated by the dashed lines in FIG. 9. The operation of the LED control module is described below in further detail with reference to FIGS. 14-20.

Figure 10:
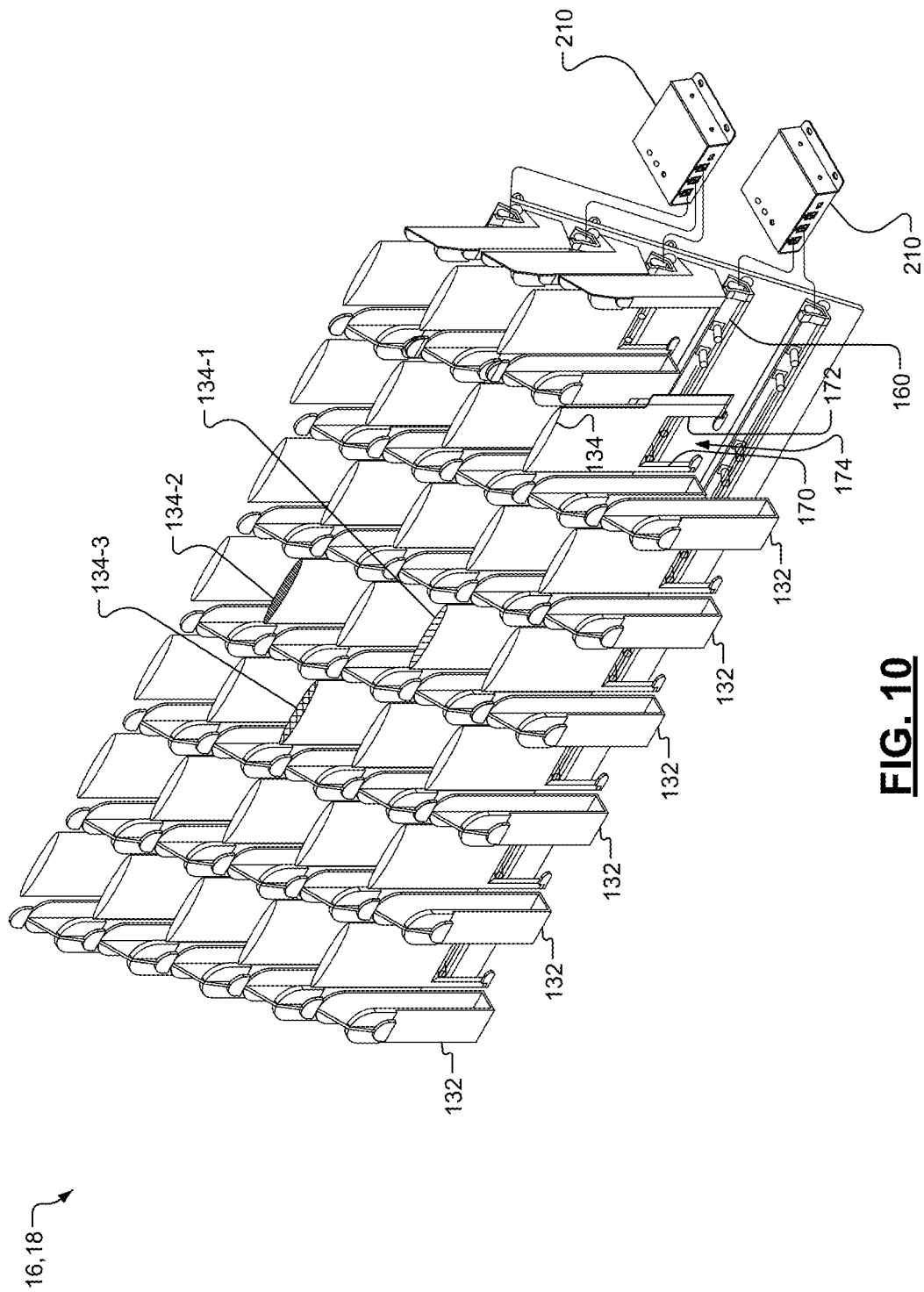
FIGS. 10-11 are detailed illustrations of an example paint color chip section of the display assembly according to the present disclosure.
Figure 11:
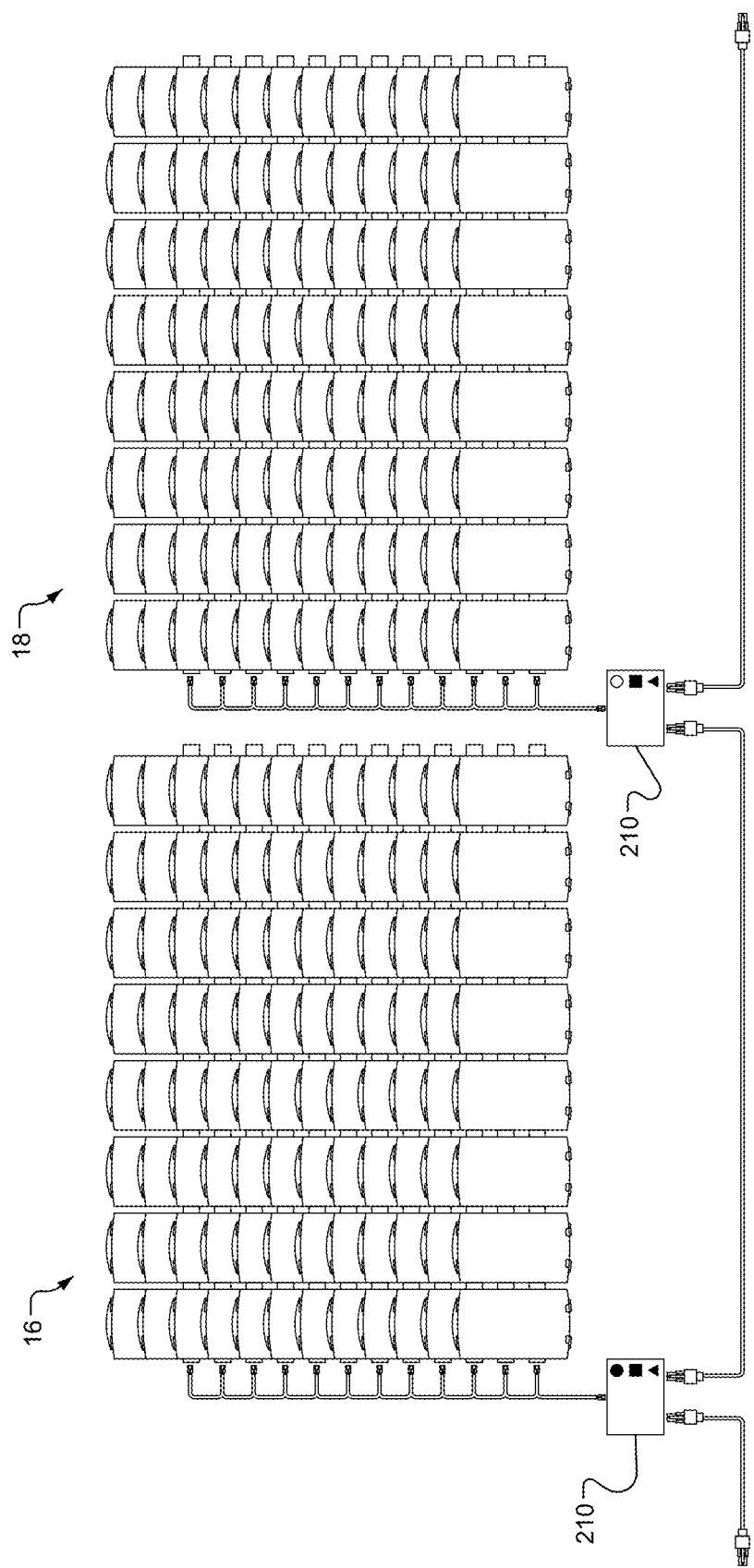
Figure 12A:
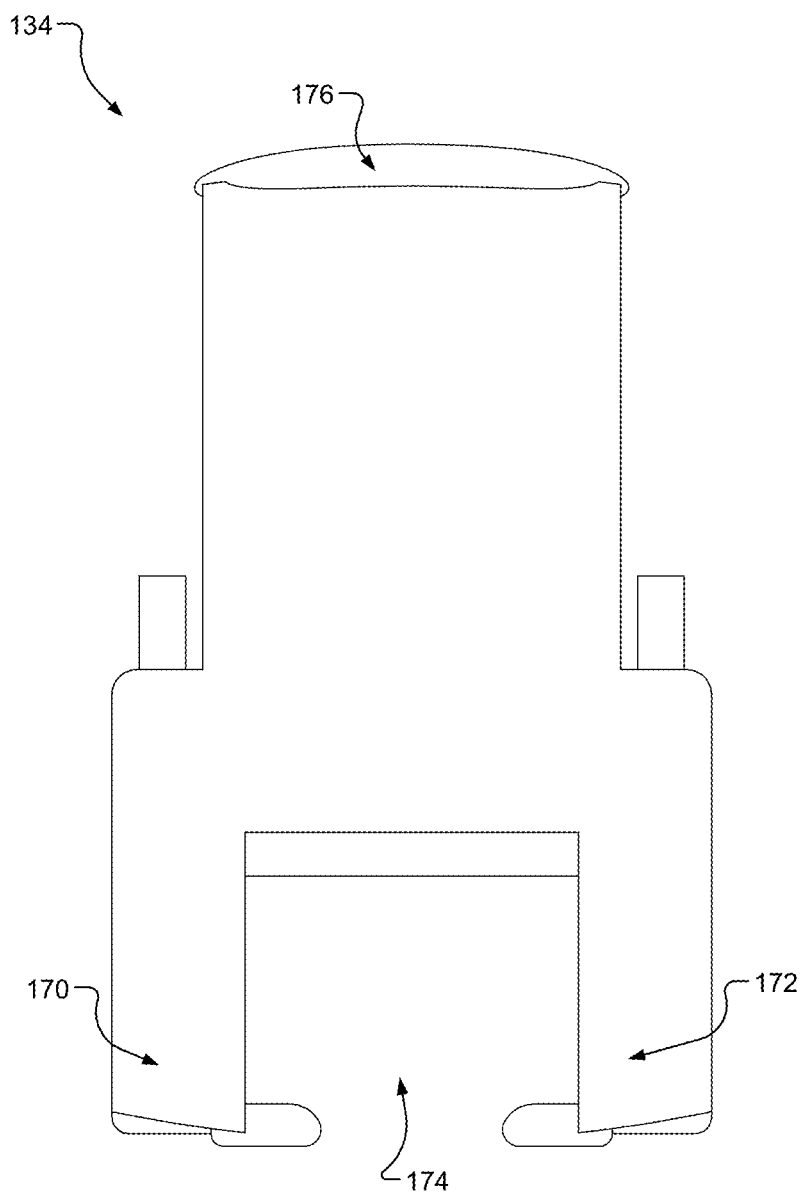
FIGS. 12A-12E are detailed illustrations of a divider tab according to the present disclosure.
Figure 12B:
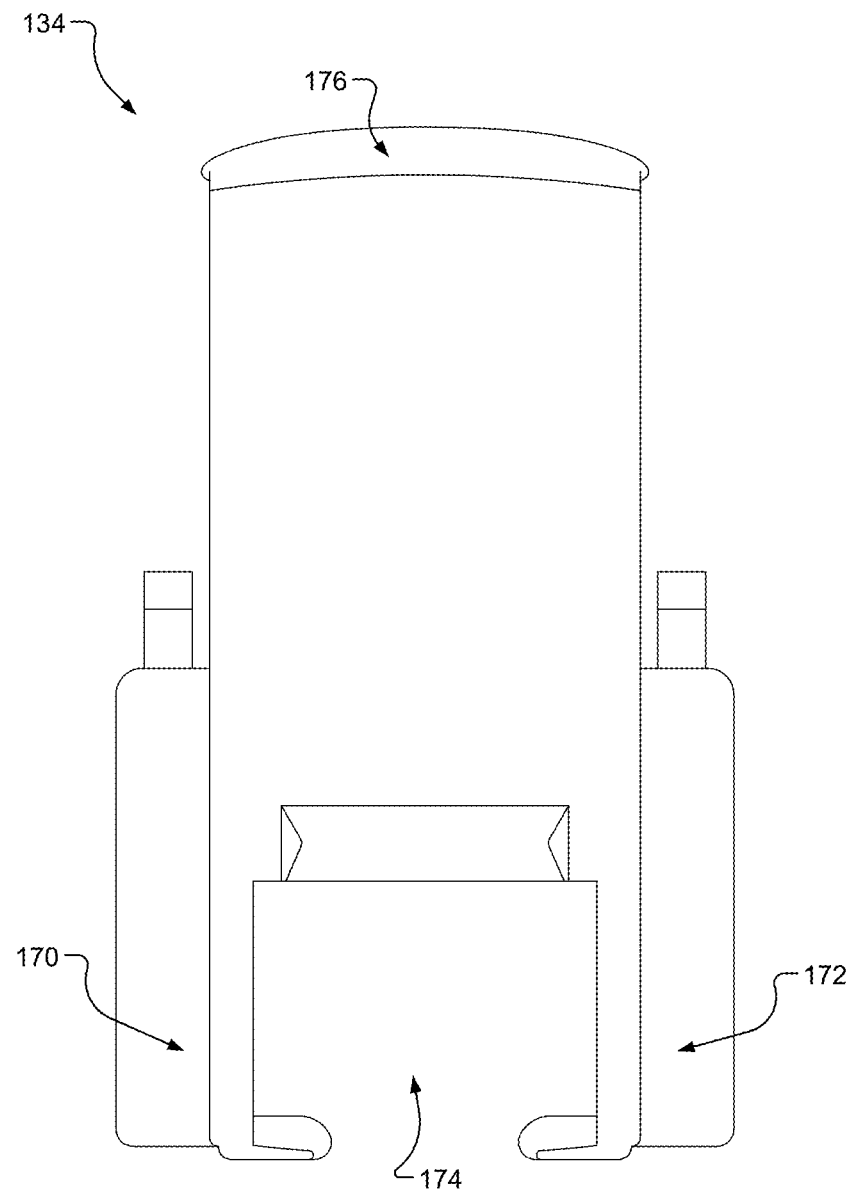
Figure 12C:
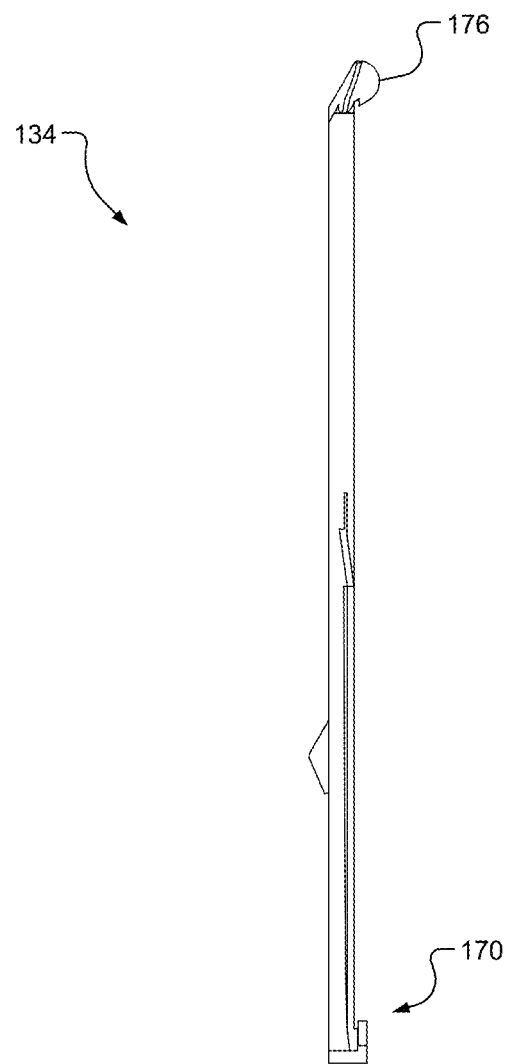
Figure 12D:
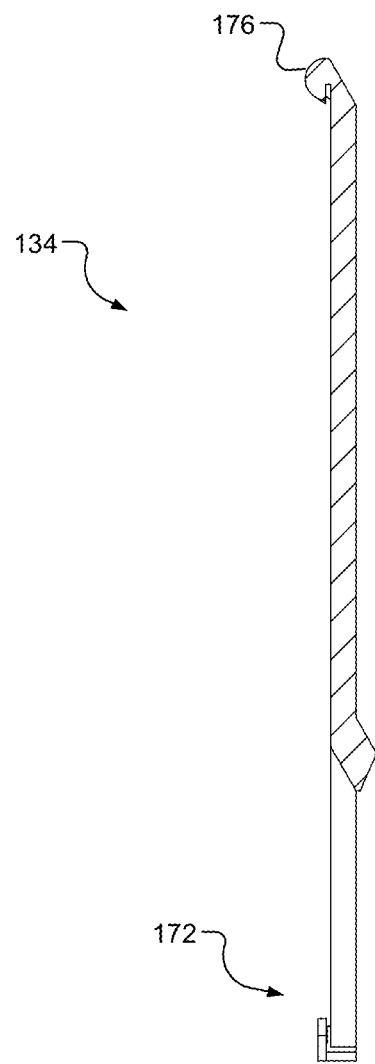
Figure 12E:
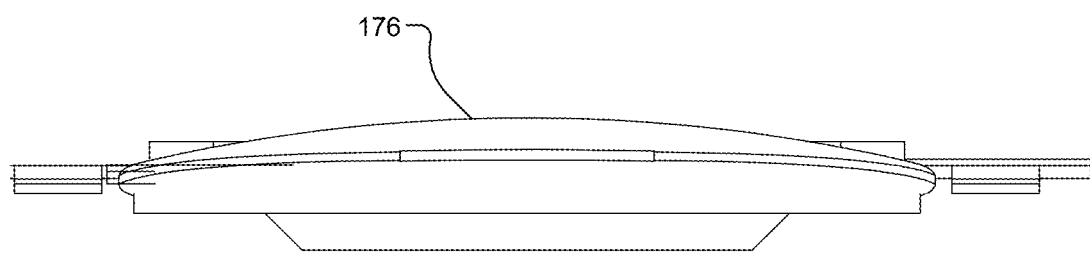

With reference to FIGS. 10-11, additional example illustrations of the paint color chip sections 16, 18 are shown. This embodiment is similar to the embodiment described above with reference to FIGS. 6-9, but in this embodiment, each of the divider tabs 134 includes a first lower portion 170, a second lower portion 172, and an opening 174 disposed between the first lower portion 170 and the second lower portion 172. Furthermore, in this embodiment, the one or more connector devices 168 may be removed, and the LED arrays 160 may receive power directly from one or more LED control modules 210, as illustrated in FIG. 11.

Similar to the embodiments described above with reference to FIGS. 6-9, in response to receiving a signal from the LED control module 210, at least one of the LEDs of the plurality of LED arrays 160 are activated and emit light. The emitted light may contact an associated divider tab 134, which is configured to illuminate in response to receiving the emitted light, as illustrated by divider tabs 134-1, 134-2, 134-3.

With reference to FIGS. 12A-12E, detailed illustrations of an example divider tab 134 are shown. As described above, the divider tab 134 includes the first lower portion 170, the second lower portion 172, and the opening 174 disposed between the first lower portion 170 and the second lower portion 172. Furthermore, the divider tab 134 may include an upper portion 176. The first lower portion 170, the second lower portion 172, and the upper portion 176 may have a geometry that enables the divider tab 134 to receive a plurality of paint color chips. Further, the geometry may enable the divider tab 134 to securely retain one of the plurality of paint color chips, thereby deterring a user from removing a last paint color chip from the respective divider tab 134.

Figure 13A:
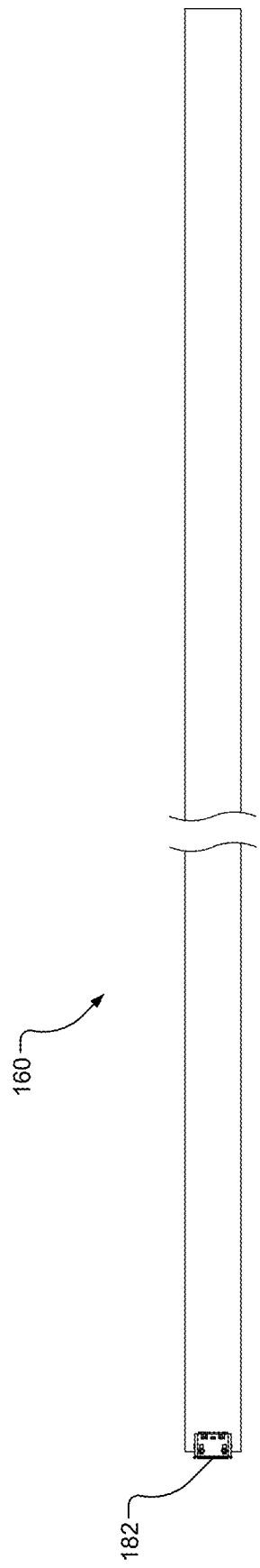
FIGS. 13A-13C are detailed illustrations of a light-emitting diode array according to the present disclosure.
Figure 13B:
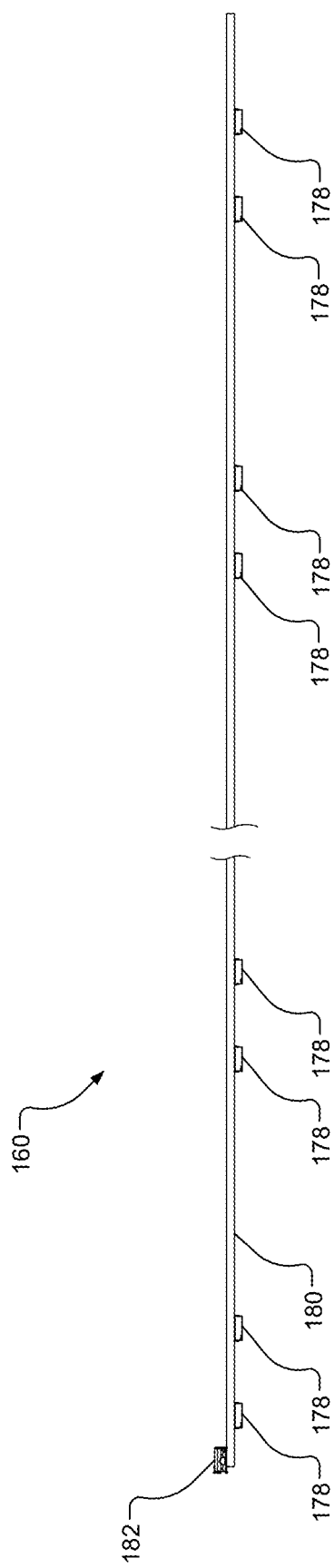
Figure 13C:
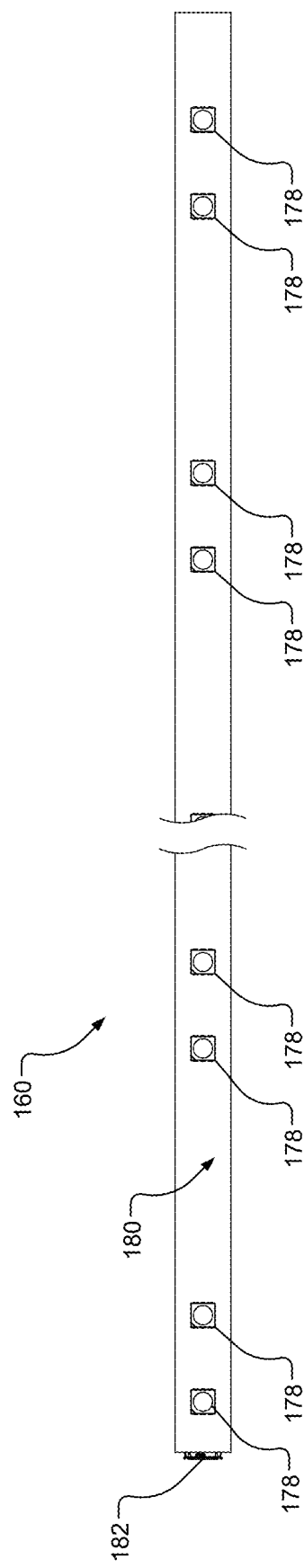

With reference to FIGS. 13A-13C, detailed illustrations of the LED array 160 are shown. The LED array 160 includes a plurality of LEDs 178 disposed on a first surface 180 of the LED array 160. The LED array 160, which may be implemented by a printed circuit board (PCB), may include a plurality of conductive paths that electrically couple the plurality of LEDs 178 to port 182 (e.g., a micro universal serial bus (micro USB) port). The port 182, which electrically couples the LED array 160 to the LED control module 210, enables signals generated by the LED control module 210 to activate the plurality of LEDs 178 of the LED array 160.

Figure 14:
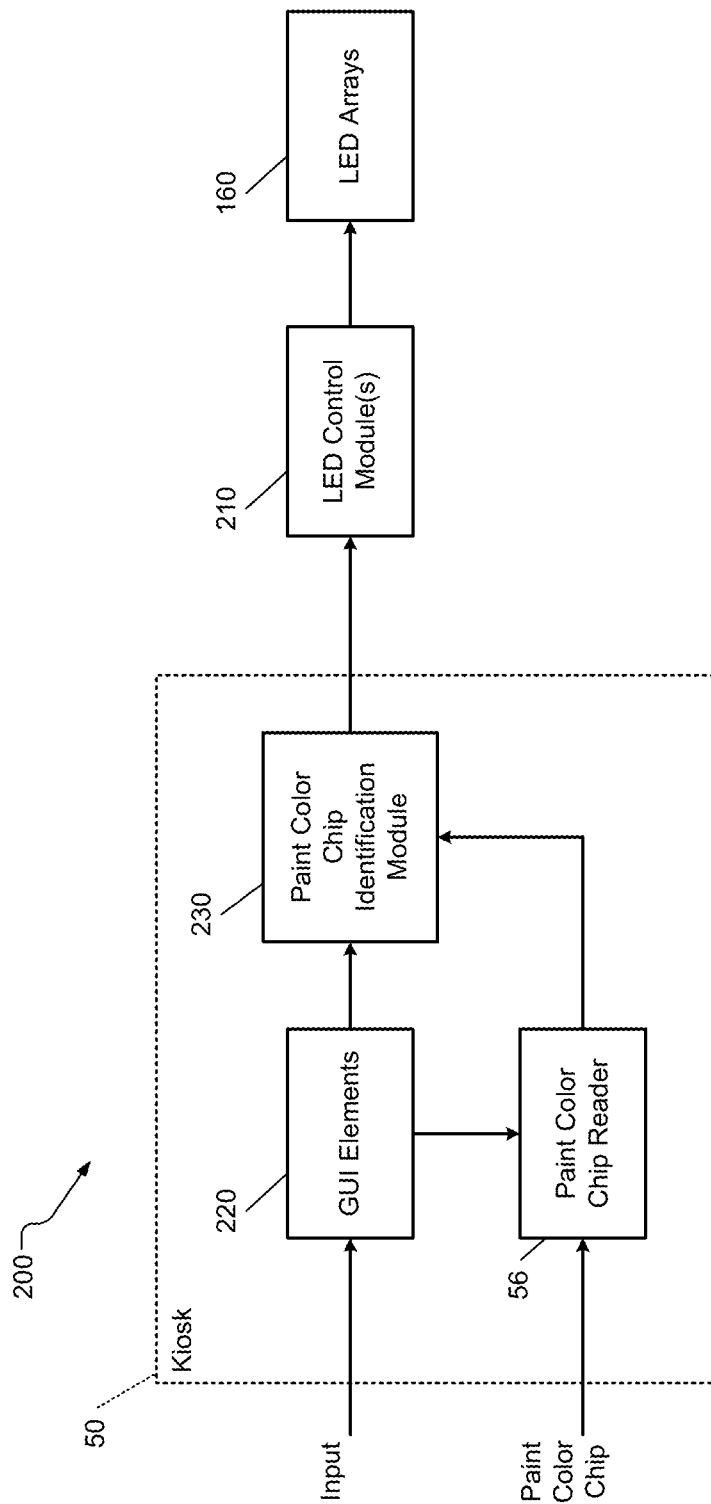
FIG. 14 is a functional block diagram of an example system according to the present disclosure.

With reference to FIG. 14, a functional block diagram of an example system 200 is shown. In one embodiment, the system 200 includes the kiosk 50, an LED control module 210, and the plurality of LED arrays 160. The kiosk 50 includes GUI elements 220, the paint color chip reader 56, and a paint color chip identification module 230. The paint color chip identification module 230 may be implemented by instructions that are stored in a nontransitory computer-readable medium, such as a random-access memory (RAM) and/or read-only memory (ROM), and that are executable by a processor. In some embodiments, the LED control module 210 may be included within one of the connector devices 168.

In one embodiment, the GUI elements 220 enable the user to interact with the kiosk 50 by touching the display 54 of the kiosk 50. Using the GUI elements 220, the user may activate the paint color chip reader 56 or may generate an input corresponding to a selection of a particular paint color chip. In response to the user inserting the paint color chip into the opening 58 and in response to activating the paint color chip reader 56 (e.g., a bar code scanner, QR code scanner, or a camera), the paint color chip reader 56 is configured to capture identifying indicia of the paint color chip. Subsequently, the paint color chip identification module 230 is configured to identify at least one of a matching paint color chip, adjacent paint color chips on the display assembly 10 (i.e., paint color chips located adjacent to the matching paint color chip), and coordinating paint color chips (e.g., complimentary paint color chips, similar paint color chips, etc.) based on the captured identifying indicia. As an example, each paint color chip may be associated with a unique bar code, QR code, or other identifying indicia that enables the paint color chip identification module 230 to readily distinguish and identify the paint color chip. As an example, the paint color chip identification module 230 may reference a lookup table that indicates, for each paint color chip, a matching paint color chip, adjacent paint color chips, and/or coordinating paint color chips.

Subsequently, the paint color chip identification module 230 identifies at least one LED of the plurality of LED arrays 160 that is associated with the matching paint color chip, adjacent paint color chips, and/or coordinating paint color chips, wherein each LED of the plurality of LED arrays 160 is associated with a respective paint color chip. As an example, the paint color chip identification module 230 may reference a lookup table that indicates, for each paint color chip, a corresponding LED of the plurality of LED arrays 160.

Once the at least one LED is identified, the paint color chip identification module 230 may transmit a signal identifying the at least one LED to the LED control module 210 via a hardwire link (e.g., a twisted pair cable) or any suitable telemetric link, such as a Bluetooth link (e.g., Bluetooth low-energy), a Wi-Fi or Wi-Fi direct link, a cellular link, etc. As an example, the paint color chip identification module 230 may include an application programming interface (API) that enables the LED control module 210 to interpret the signal identifying the at least one LED from the paint color chip identification module 230.

Figure 15:
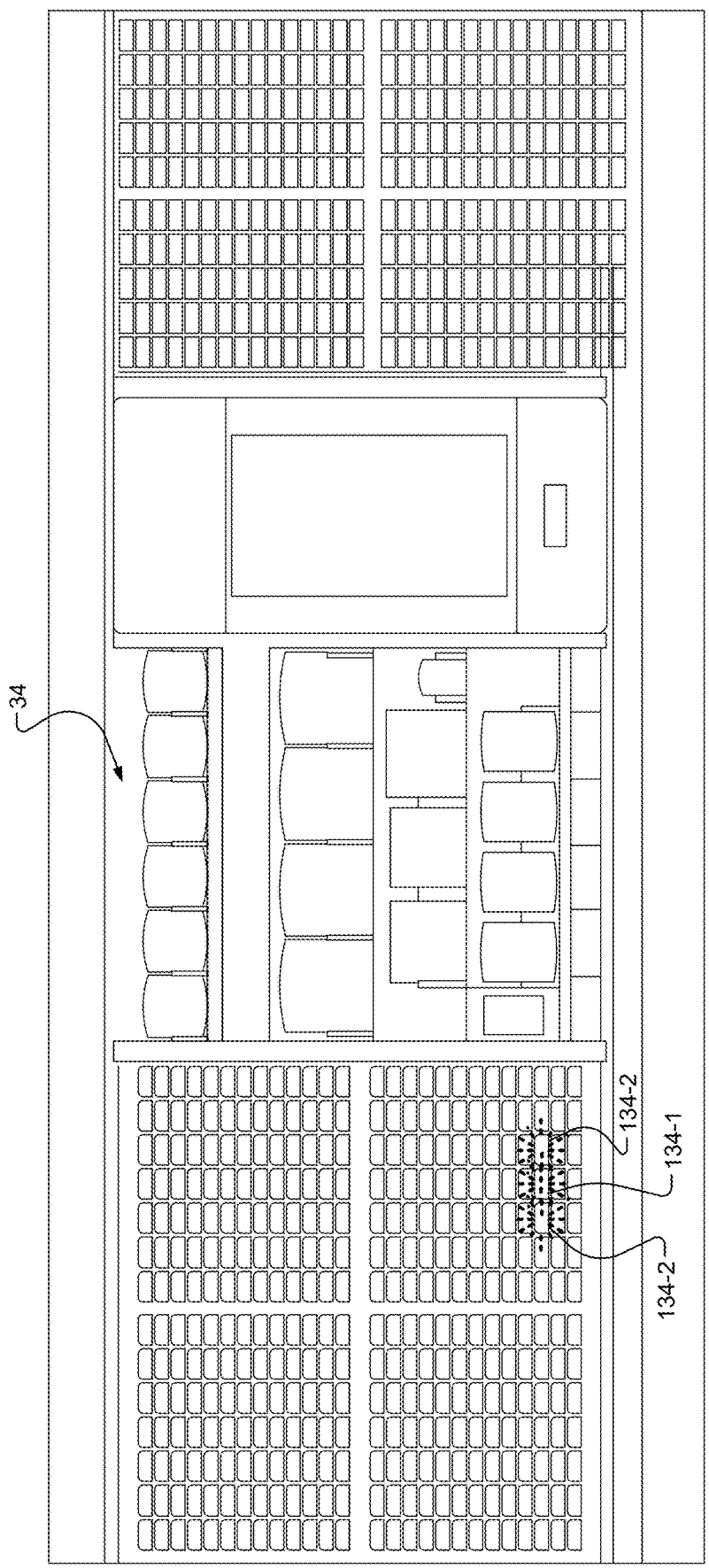
FIG. 15 is a detailed illustration of the paint color chip sections of the display assembly with identified paint color chips according to the present disclosure.

The LED control module 210 may be implemented by an addressable LED control circuit or other similar LED control circuitry. In response to receiving the signal, the LED control module 210 activates the at least one LED, thereby causing the associated divider tab 134 to illuminate and appear as any predefined color, brightness, intensity, on-duration, or other distinguishing light patterns (e.g., divider tab 134-1 associated with the matching paint color chip appears red, and divider tabs 134-2, which correspond to the adjacent colors, appear as white; and/or divider tab 134-1 turns on and off every 0.1 seconds, while divider tabs 134-2 turn on and off every 0.3 seconds), as shown in FIG. 15. Accordingly, a user may easily identify the location of the matching, adjacent, or coordinating paint color chips within the paint color chip sections 16, 18 of the display assembly 10. Alternatively, in response to receiving the signal, the LED control module 210 may activate a plurality of LEDs of the at least one LED array 160, thereby causing a plurality of divider tabs 134 to illuminate (e.g., each divider tab 134 to the left or right of divider tab 134-1 are sequentially or simultaneously illuminated in order to guide a user to divider tab 134-1).

While this embodiment illustrates the kiosk 50, in other embodiments, any suitable computing device may be used, such as a smartphone, tablet device, desktop computer, etc. Accordingly, the computing device may include an API that enables the computing device to selectively communicate with the LED control module 210 (e.g., a smartphone with a corresponding application executing on the smartphone may initiate communication with the LED control module 210 when the smartphone is within a predetermined range of the display assembly 10) and the LED control module 210 to interpret the signal identifying the at least one LED and transmitted by the computing device.

Figure 16:
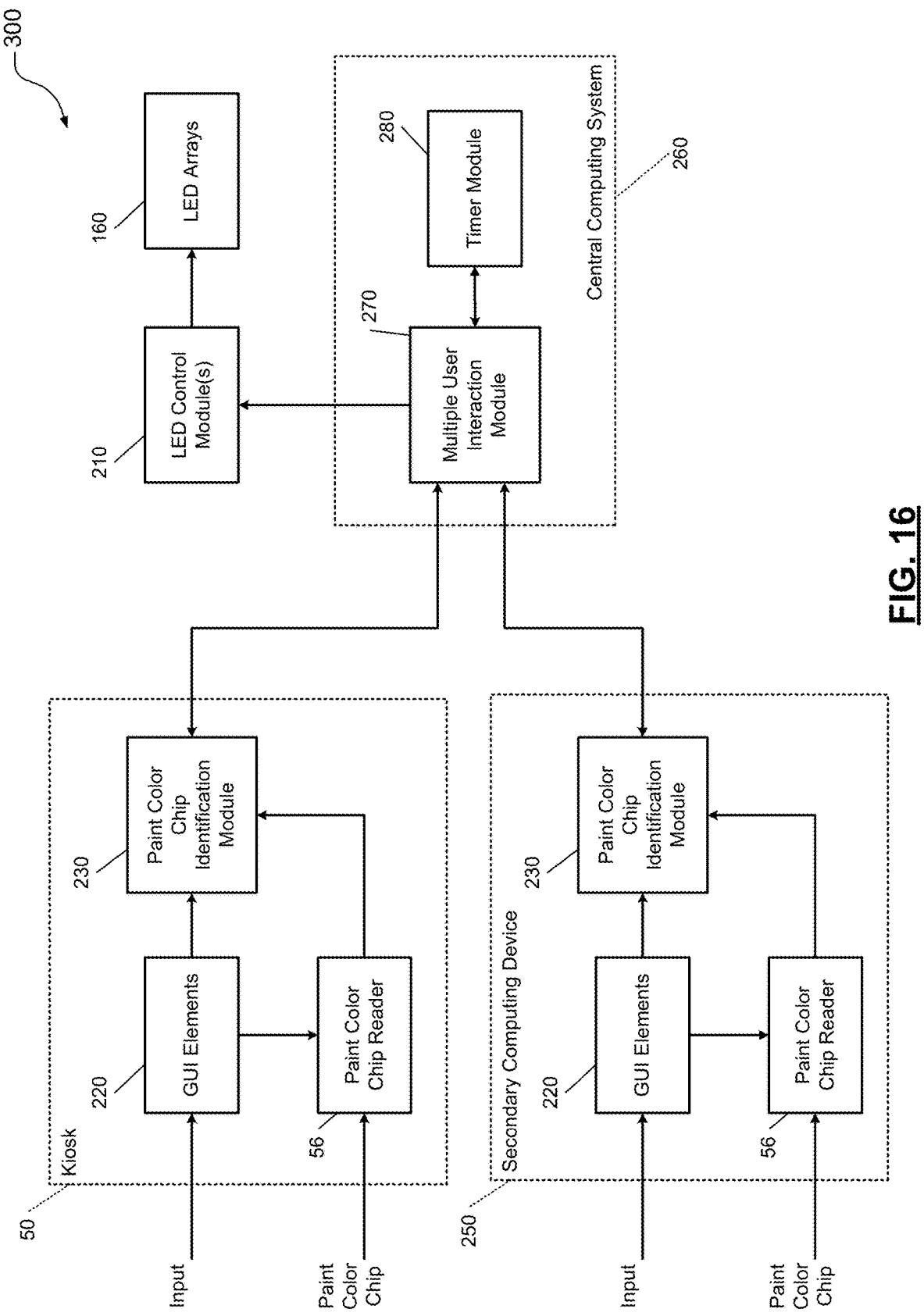
FIG. 16 is a functional block diagram of an example system according to the present disclosure.

With reference to FIG. 16, another functional block diagram of a system 300 is shown. In one embodiment, the system 300 includes the kiosk 50, the plurality of LED arrays 160, the LED control module 210, a secondary computing device 250, and a central computing system 260. The secondary computing device 250 (e.g., a tablet, a smartphone, a laptop, or other similar device) may also include the GUI elements 220, the paint color chip reader 56, and the paint color chip identification module 230. The central computing system 260 (e.g., a server computer) may include a multiple user interaction module 270 and a timer module 280, both of which may be implemented by instructions that are stored in a nontransitory computer-readable medium, such as a random-access memory (RAM) and/or read-only memory (ROM), and that are executable by a processor of the central computing system 260. Furthermore, the paint color chip identification module 230 may include respective APIs that enable the kiosk 50 and any type of secondary computing device 250 to communicate with the multiple user interaction module 270 and/or the LED control module 210.

In one embodiment, once the paint color chip identification module 230 of the kiosk 50 identifies the at least one LED of the plurality of LED arrays 160 based on the identifying indicia, the paint color chip identification module 230 may transmit the signal identifying the at least one LED to the multiple user interaction module 270. The paint color chip identification module 230 may transmit the signal to the multiple user interaction module 270 using a hardwire link (e.g., a twisted pair cable) or any suitable telemetric link, such as a Bluetooth link (e.g., Bluetooth low-energy), a Wi-Fi or Wi-Fi direct link, a cellular link, etc. Once the multiple user interaction module 270 receives the signal, the timer module 280 is activated. If the multiple user interaction module 270 does not receive a second signal identifying another at least one LED from the secondary computing device 250 when a value of the timer module 280 is below a threshold value, the multiple user interaction module 270 is configured to determine that only one user is interacting with the display assembly 10. Accordingly, the multiple user interaction module 270 may transmit the signal identifying the at least one LED to the LED control module 210. In response to receiving the signal from the multiple user interaction module 270, the LED control module 210 activates the at least one LED, thereby causing the associated divider tab 134 to illuminate, as described above.

If the multiple user interaction module 270 receives the second signal identifying another at least one LED while a value of the timer module 280 is below a threshold value, the multiple user interaction module 270 is configured to determine that multiple users are interacting with the display assembly 10. In other words, the multiple user interaction module 270 may determine that the paint color chip identification module 230 of the kiosk 50 has identified a first matching paint color chip, and the paint color chip identification module 230 of the secondary computing device 250 has identified a second matching paint color chip.

Accordingly, the multiple user interaction module 270 may assign a first lighting characteristic to the kiosk 50 and a second lighting characteristic to the secondary computing device 250. As described herein, lighting characteristics may be defined as a brightness, color, intensity, on-duration (e.g., the corresponding LED is always on or the corresponding LED turns on and off at a given frequency), or other distinguishing light patterns. As an example, the first lighting characteristic, which is associated with the kiosk 50, may be associated with (i) activating the LED corresponding to the matching first paint color chip such that the corresponding divider tab 134 appears red, and (ii) activating the LEDs corresponding to the adjacent and/or coordinating colors of the first paint color chip such that the corresponding divider tabs 134 appear white. Furthermore, the second lighting characteristic, which is associated with the secondary computing device 250, may be associated with (i) activating the LED corresponding to the matching second paint color chip such that the corresponding divider tab 134 appears blue, and (ii) activating the LEDs corresponding to the adjacent and/or coordinating colors of the second paint color chip such that the corresponding divider tabs 134 appear white and turn on and off every 0.5 seconds.

Figure 17:
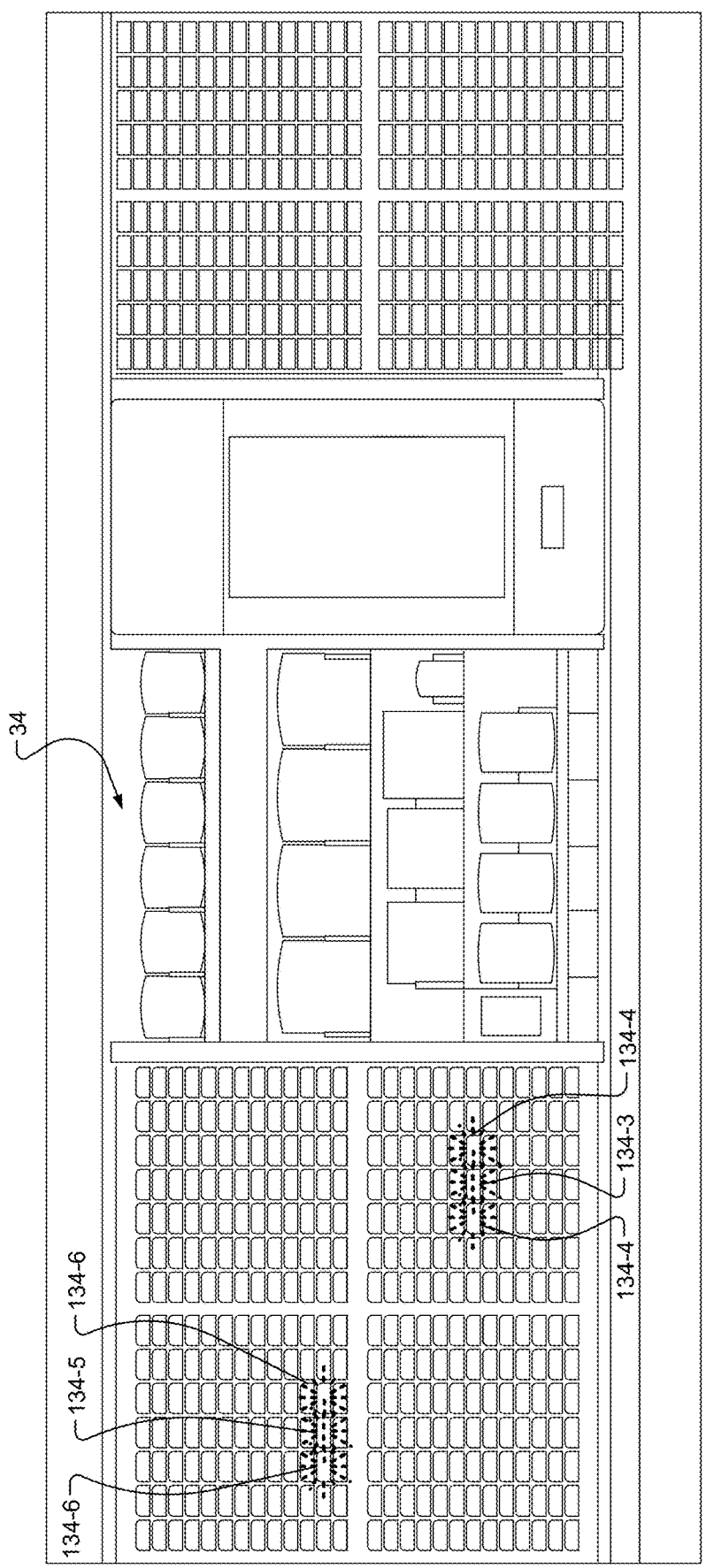
FIG. 17 is a detailed illustration of the paint color chip sections of the display assembly with identified paint color chips according to the present disclosure.

Once the multiple user interaction module 270 has assigned a lighting characteristic to each peripheral device, the multiple user interaction module 270 may transmit a signal identifying the at least one LED, along with information corresponding to the respective lighting characteristic, to the LED control module 210. In response to receiving the signal identifying the at least one LED and the corresponding lighting characteristic, the LED control module 210 is configured to activate the respective at least one LED based on the corresponding lighting characteristic. As an example and as shown in FIG. 17, the LED control module 210 is configured to activate: (i) the LED corresponding to the matching first paint color chip such that the corresponding divider tab 134-3 appears as a first color, and (ii) the LEDs corresponding to the adjacent and/or coordinating colors of the first paint color chip such that the corresponding divider tabs 134-4 appear white. Likewise, the LED control module 210 is configured to activate: (i) the LED corresponding to the matching second paint color chip such that the corresponding divider tab 134-5 appears as a second color, and (ii) the LEDs corresponding to the adjacent and/or coordinating colors of the second paint color chip such that the corresponding divider tabs 134-6 appear white and turn on and off every 0.5 seconds.

Furthermore, if the multiple user interaction module 270 determines that multiple users are interacting with the display assembly 10, the central computing system 260 may transmit a notification signal to each paint color chip identification module 230, and the notification signal is configured to instruct a user of the lighting characteristic of the respective computing device. As an example, in response to the paint color chip identification module 230 of the kiosk 50 receiving the notification signal, the display 54 of the kiosk 50 may instruct the user to look for divider tabs 134 that are illuminated based on the first lighting characteristic, (e.g., the divider tab 134 corresponding to the matching paint color chip appears red, the divider tabs 134 corresponding to the adjacent and/or coordinating colors appear white).

While the above embodiment is described using the kiosk 50 and the secondary computing device 250, in other embodiments, multiple secondary computing devices 250 may be in communication with the central computing system 260, and the kiosk 50 may be replaced with an additional secondary computing device 250. Accordingly, when multiple secondary computing devices 250 are interacting with the display assembly 10, each of the multiple secondary computing devices 250 may be assigned a lighting characteristic, thereby enabling any number of users to simultaneously interact with the display assembly 10 and locate a matching, adjacent, and/or coordinating paint color chip.

Figure 18:
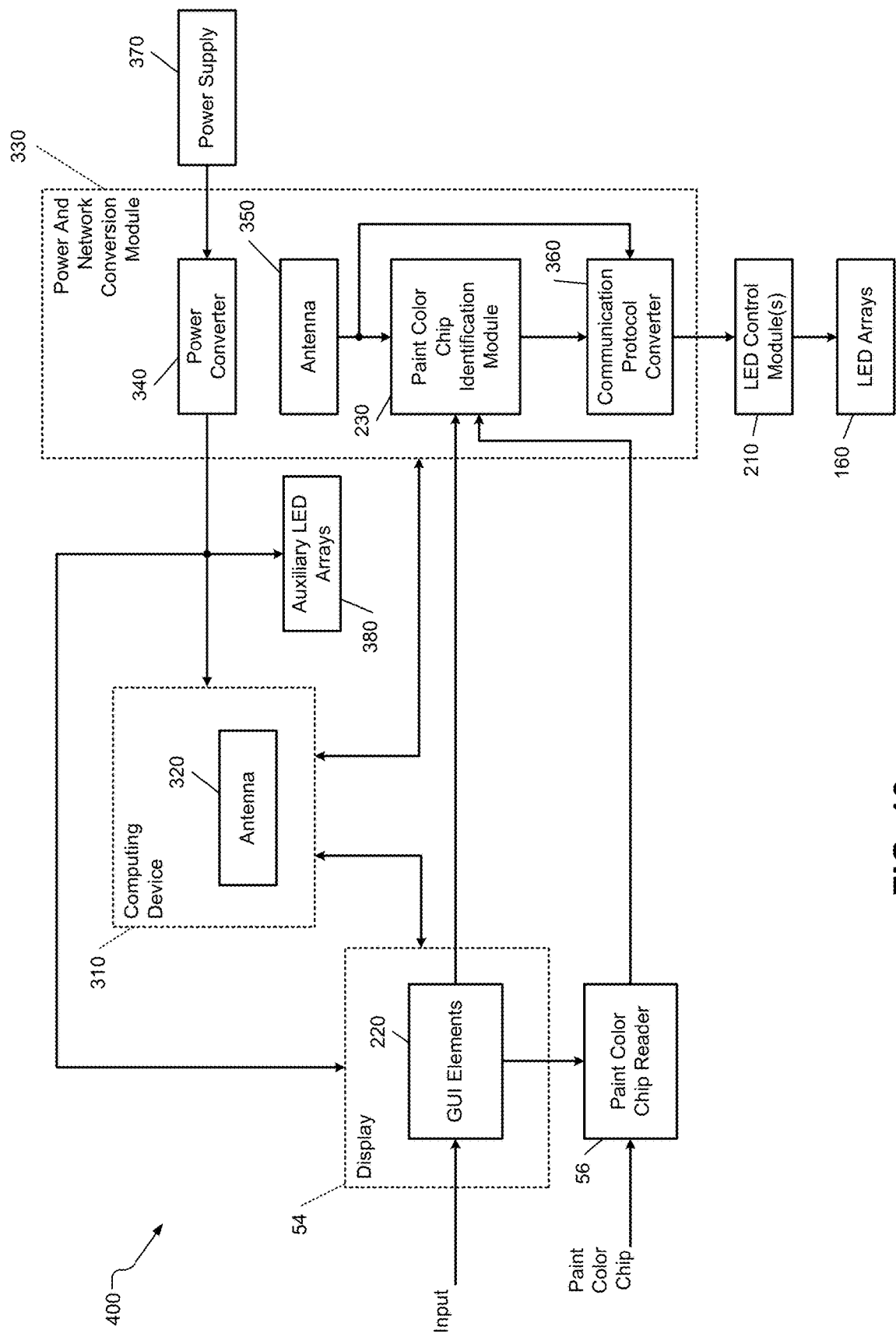
FIG. 18 is a functional block diagram of an example system according to the present disclosure.

With reference to FIG. 18, a functional block diagram of a system 400 is shown. In this embodiment, the display 54 and a computing device 310 are implemented as separate components that are in communication via a hardwire link (e.g., a USB cable and/or a high definition multimedia interface (HDMI) cable). Furthermore, the computing device 310 may include APIs for communicating with a power and network conversion module 330. The computing device 310 may also include an antenna 320 in order to receive wireless firmware updates from a remote computer.

As described above, the paint color chip identification module 230 is configured to identify at least one of a matching paint color chip, adjacent paint color chips, and coordinating paint color chips based on the identifying indicia obtained by the paint color chip reader 56 or the input received by one of the GUI elements 220 of the display 54. Subsequently, the paint color chip identification module 230 identifies at least one LED of the plurality of LED arrays 160 and transmits the signal identifying the at least one LED to a communication protocol converter 360 of the power and network conversion module 330.

Prior to the communication protocol converter 360 transmitting the signal identifying the at least one LED to the LED control module 210, the communication protocol converter 360 may convert the communication protocol of the signal generated by the paint color chip identification module 230 to a communication protocol suitable for the LED control module 210. As an example, the communication protocol converter 360 may convert the signal transmitted by the paint color chip identification module 230 to a communication protocol used in controller area networks (CANs), local interconnect networks (LIN), clock extension peripheral interface (CXPI) networks, or other similar networks.

Furthermore, the power and network conversion module 330 may include a power converter 340 that is configured to receive power from a power supply 370 and output suitable power for operating the display 54, the computing device 310, and auxiliary LED arrays 380 that may be disposed on the display assembly 10. As an example, the power converter 340 may be implemented by a DC-DC converter circuit (e.g. a boost circuit, buck circuit, buck-boost circuit, voltage regulator integrated circuit, etc.), or an AC-DC converter circuit (a rectifier circuit and DC-DC converter circuit for converting the magnitude of the voltage output by the rectifier).

Additionally, the power and network conversion module 330 may include an antenna 350 in order to wirelessly communicate with peripheral devices (e.g., the antenna 350 enables the communication protocol converter 360 to establish wireless communication links, such as Bluetooth and Wi-Fi links, with peripheral devices) and to receive wireless firmware updates from a remote computer.

Figure 19:
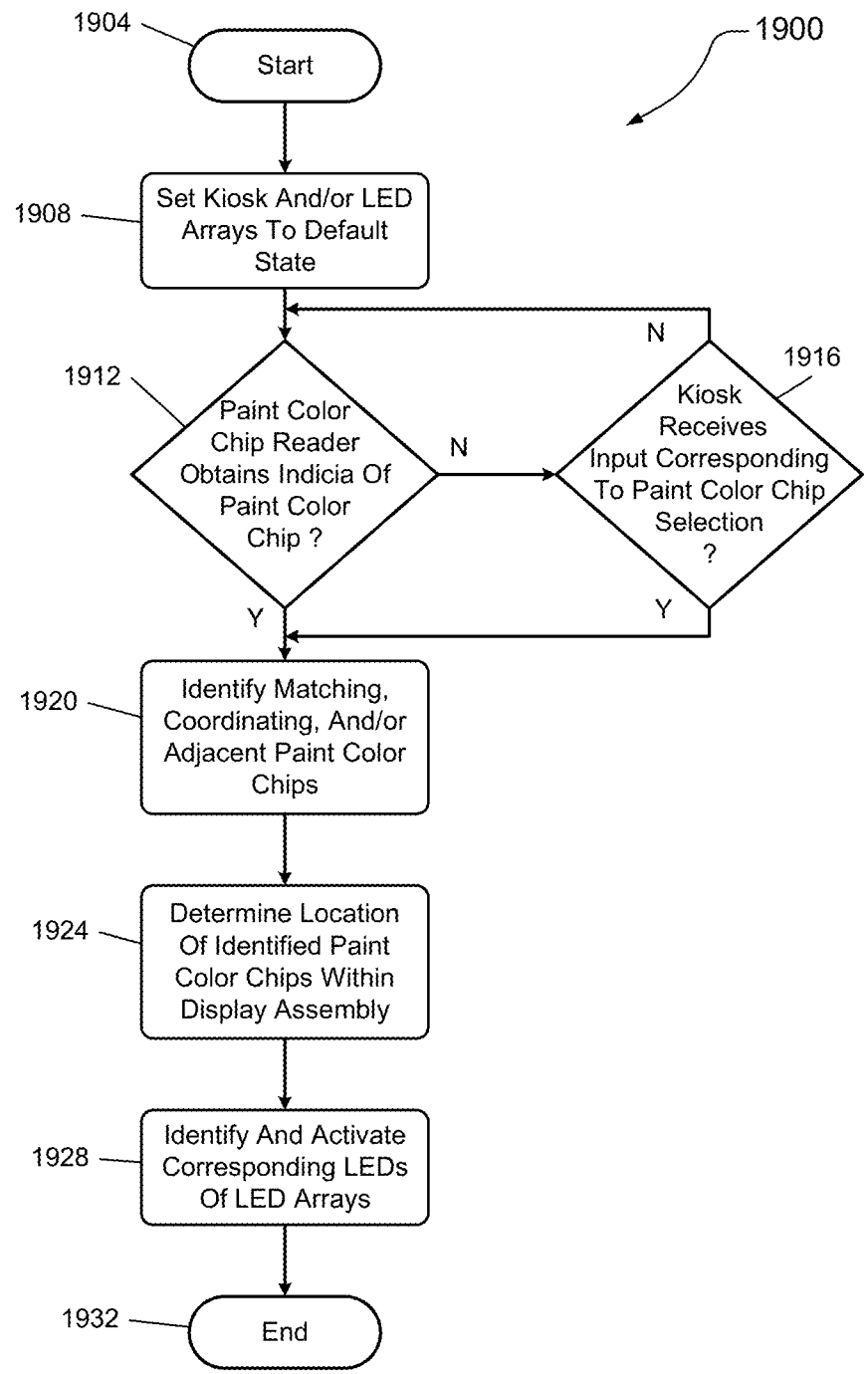

With reference to FIG. 19, a flowchart illustrating an example control algorithm 1900 is shown. The control algorithm 1900 starts at 1904 when, for example, the kiosk 50 is installed in the display assembly 10 and turned on. At 1908, the control algorithm 1900 sets the kiosk 50 and/or the plurality of LED arrays 160 to a default state. During the default state of the kiosk 50, the display 54 of the kiosk 50 may present text, graphics, or other visual elements that capture the attention of the user and instruct the user how to operate the kiosk 50 and/or the paint color chip reader 56. During the default state of the plurality of LED arrays 160, the LED control module 210 activates certain LEDs of the plurality of LED arrays 160 such that it may direct the attention of the user to the kiosk 50. At 1912, the control algorithm 1900 determines, using the paint color chip identification module 230, whether the paint color chip reader 56 has obtained identifying indicia associated with a paint color chip. If so, the control algorithm 1900 proceeds to 1920; otherwise, the control algorithm 1900 proceeds to 1916. At 1916, the control algorithm 1900 determines, using the paint color chip identification module 230, whether the kiosk 50 has received an input corresponding to a paint color chip selection (e.g., a selection of one of the GUI elements 220 indicating a selection of a paint color chip). If so, the control algorithm 1900 proceeds to 1920; otherwise, the control algorithm 1900 proceeds to 1912.

At 1920, the control algorithm 1900 identifies, using the paint color chip identification module 230, matching, coordinating, and/or adjacent paint color chips. At 1924, the control algorithm 1900 determines, using the paint color chip identification module 230, the location of the identified paint color chips within the display assembly 10. At 1928, the control algorithm 1900 identifies and activates the corresponding LEDs of the plurality of LED arrays 160 and then ends at 1932.

Figure 20:
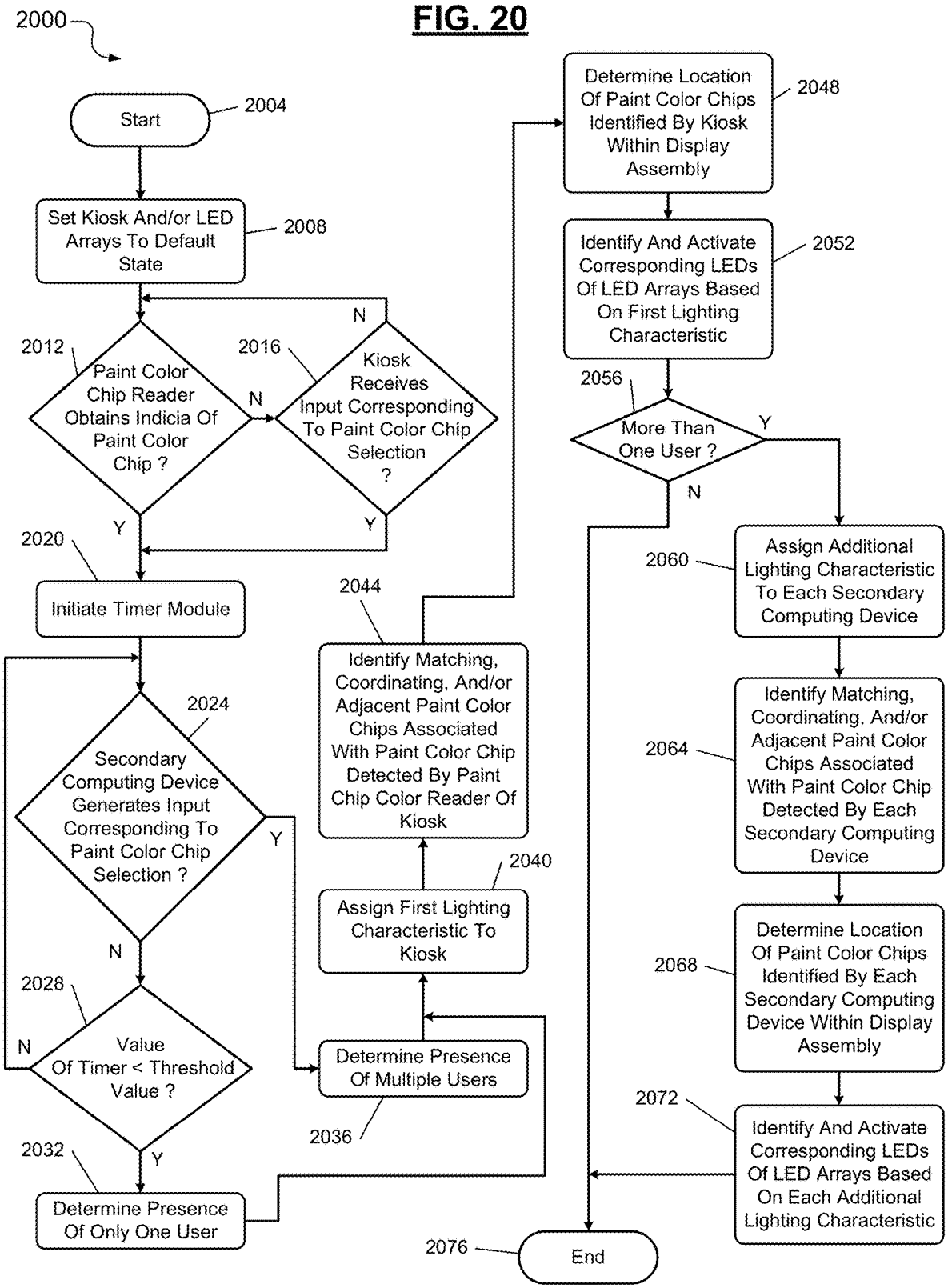

With reference to FIG. 20, a flowchart illustrating an example control algorithm 2000 is shown. The control algorithm 2000 starts at 2004 when, for example, the kiosk 50 is installed in the display assembly 10 and when the kiosk 50 and the one or more secondary computing devices 250 are turned on. At 2008, the control algorithm 2000 sets the kiosk 50 and/or the plurality of LED arrays 160 to a default state, as described above with reference to FIG. 13. At 2012, the control algorithm 2000 determines, using the paint color chip identification module 230 of the kiosk 50, whether the paint color chip reader 56 has obtained identifying indicia associated with a paint color chip. If so, the control algorithm 2000 proceeds to 2020; otherwise, the control algorithm 2000 proceeds to 2016. At 2016, the control algorithm 2000 determines, using the paint color chip identification module 230, whether the kiosk 50 has received an input corresponding to a paint color chip selection (e.g., a selection of one of the GUI elements 220 indicating a selection of a paint color chip). If so, the control algorithm 2000 proceeds to 2020; otherwise, the control algorithm 2000 proceeds to 2012.

At 2020, the control algorithm 2000 initiates, using the central computing system 260, the timer module 280. At 2024, the control algorithm 2000 determines, using the central computing system 260, whether the secondary computing device 250 has generated an input corresponding to a selection of a paint color chip. If so, the control algorithm 2000 proceeds to 2036; otherwise, the control algorithm 2000 proceeds to 2028. At 2028, the control algorithm 2000 determines, using the central computing system 260, whether a value of the timer is less than a threshold value (e.g., one second). If so, the control algorithm 2000 proceeds to 2032; otherwise, the control algorithm 2000 proceeds to 2024. At 2032, the control algorithm 2000 determines, using the central computing system 260, a presence of only one user interacting with the display assembly 10 and then proceeds to 2040. At 2036, the control algorithm 2000 determines, using the central computing system 260, a presence of multiple users interacting with the display assembly 10 and then proceeds to 2040.

At 2040, the control algorithm 2000 assigns, using the central computing system 260, a first lighting characteristic to the kiosk 50. At 2044, the control algorithm 2000 identifies, using the kiosk 50, matching, coordinating, and/or adjacent paint color chips associated the paint color chip detected by the paint color chip reader 56 of the kiosk 50. At 2048, the control algorithm 2000 determines, using the kiosk 50, the location of the paint color chips identified by the kiosk 50 within the display assembly 10. At 2052, the control algorithm 2000 identifies and activates the corresponding LEDs of the plurality of LED arrays 160 based on the first lighting characteristic. At 2056, the control algorithm 2000 determines, using the central computing system 260, whether more than one user is interacting with the display assembly 10. If so, the control algorithm 2000 proceeds to 2060; otherwise, the control algorithm 2000 proceeds to 2076.

At 2060, the control algorithm 2000 assigns, using the central computing system 260, additional lighting characteristics to each of the secondary computing devices 250. At 2064, the control algorithm 2000 identifies, using the secondary computing devices 250, matching, coordinating, and/or adjacent paint color chips associated the paint color chip detected by the paint color chip reader 56 of the respective secondary computing devices 250. At 2068, the control algorithm 2000 determines, using the secondary computing devices 250, the location of the paint color chips identified by the respective secondary computing devices 250 within the display assembly 10. At 2072, the control algorithm 2000 identifies and activates the corresponding LEDs of the plurality of LED arrays 160 based on each of the additional lighting characteristics and then ends at 2076.

With reference to FIG. 21, a flowchart illustrating an example control algorithm 2100 is shown. The control algorithm 2100 starts at 2104 when, for example, the kiosk 50 is installed in the display assembly 10 and turned on. At 2108, the control algorithm 2100 sets the kiosk 50 and/or the plurality of LED arrays 160 to a default state. During the default state of the kiosk 50, the display 54 of the kiosk 50 may present text, graphics, or other visual elements that capture the attention of the user and instruct the user how to operate the kiosk 50 and/or the paint color chip reader 56. During the default state of the plurality of LED arrays 160, the LED control module 210 activates certain LEDs of the plurality of LED arrays 160 such that it may direct the attention of the user to the kiosk 50. At 2112, the control algorithm 2100 determines, using the paint color chip identification module 230, whether the paint color chip reader 56 has obtained identifying indicia associated with a paint color chip. If so, the control algorithm 2100 proceeds to 2120; otherwise, the control algorithm 2100 proceeds to 2116.

At 2116, the control algorithm 2100 determines, using the paint color chip identification module 230, whether the kiosk 50 or the power and network conversion module 360 has received an input corresponding to a paint color chip selection (e.g., a selection of one of the GUI elements 220 indicating a selection of a paint color chip). If so, the control algorithm 2100 proceeds to 2120; otherwise, the control algorithm 2100 proceeds to 2112.

At 2120, the control algorithm 2100 assigns a unique lighting characteristic (e.g., a color) to each user. At 2124, the control algorithm 2100 identifies, using the paint color chip identification module 230, matching, coordinating, and/or adjacent paint color chips. At 2128, the control algorithm 2100 determines, using the paint color chip identification module 230, the location of the identified paint color chips within the display assembly 10. At 2128, the control algorithm 2100 identifies and activates the corresponding LEDs of the plurality of LED arrays 160 based on each lighting characteristic and then ends at 2132.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
   a display assembly configured to display a plurality of paint color chips at a plurality of paint color chip locations, each paint color chip location having a divider tab;
   at least one light-emitting diode (LED) array having a plurality of LEDs, wherein each LED of the plurality of LEDs is associated with a respective paint color chip location of the plurality of paint color chip locations and configured to illuminate the divider tab at the respective paint color chip location; and
   an LED control circuit in communication with each LED of the plurality of LEDs and in communication with a computing device configured to determine a particular paint color chip of the plurality of paint color chips based on received input, determine a particular paint color chip location within the display assembly associated with the particular paint color chip, identify a particular LED of the plurality of LEDs associated with the particular paint color chip location, and transmit an activation signal to the LED control circuit;

wherein the LED control circuit is configured to receive the activation signal from the computing device and activate the particular LED to illuminate the divider tab located at the particular paint color chip location within the display assembly.

2. The system of claim 1, wherein the computing device is included in a kiosk included in the display assembly.

3. The system of claim 1, wherein the computing device is one of a PC, a laptop, a tablet device, and a smartphone.

4. The system of claim 1, wherein the received input indicates a particular paint color and wherein the computing device is further configured to determine the particular paint color chip based on the particular paint color chip having a paint chip color that at least one of matches the particular paint color and coordinates with the particular paint color.

5. The system of claim 1, wherein the received input indicates a particular paint color and wherein the computing device is further configured to:
 determine the particular paint color chip based on the particular paint color chip having a paint chip color that matches the particular paint color;
 determine at least one additional paint color chip location within the display assembly based on the particular paint color chip, the at least one additional paint color chip location corresponding to a location of a coordinating paint color chip having a coordinating paint chip color that coordinates with the paint chip color of the particular paint color chip;
 identify at least one additional LED of the plurality of LEDs, the at least one additional LED being associated with the at least one additional paint color chip location; and
 transmit an additional activation signal to the LED control circuit to activate the at least one additional LED;
 wherein the LED control circuit is configured to receive the additional activation signal from the computing device and activate the at least one additional LED to illuminate the divider tab located at the additional paint color chip location within the display assembly.

6. The system of claim 1, wherein the received input is generated by a paint color chip reader that is configured to obtain identifying indicia associated with the particular paint color chip.

7. The system of claim 1, wherein:
 the received input indicates a particular paint color and the particular paint color chip has a paint chip color that matches the particular paint color;
 the divider tab located at the particular paint color chip location is illuminated by the particular LED with a first LED color; and
 the computing device is further configured to transmit an additional activation signal to the LED control circuit to activate an additional LED and illuminate an additional divider tab located at an additional paint color chip location with a second LED color, the additional paint color chip location being associated with an additional paint color chip that has an additional paint chip color that coordinates with the paint chip color of the particular paint color chip;
 wherein the LED control circuit is configured to receive the additional activation signal from the computing device and activate the additional LED to illuminate the additional divider tab located at the additional paint color chip location with the second LED color.

8. A method comprising:
 receiving, with a light-emitting diode (LED) control circuit, an activation signal from a computing device, the LED control circuit being in communication with each LED of a plurality of LEDs of at least one LED array, each LED of the plurality of LEDs being associated with a respective paint color chip location of a plurality of paint color chip locations of a display assembly configured to display a plurality of paint color chips at the plurality of paint color chip locations, each paint color chip location having a divider tab, and each LED of the plurality of LEDs being configured to illuminate the divider tab at the respective paint color chip location, the computing device being configured to determine a particular paint color chip of the plurality of paint color chips based on received input, determine a particular paint color chip location within the display assembly associated with the particular paint color chip, identify a particular LED of the plurality of LEDs associated with the particular paint color chip location, and transmit an activation signal to the LED control circuit; and
 activating, with the LED control circuit, the particular LED to illuminate the divider tab located at the particular paint color chip location within the display assembly.

9. The method of claim 8, wherein the computing device is included in a kiosk included in the display assembly.

10. The method of claim 8, wherein the computing device is one of a PC, a laptop, a tablet device, and a smartphone.

11. The method of claim 8, wherein the received input indicates a particular paint color and wherein the computing device is further configured to determine the particular paint color chip based on the particular paint color chip having a paint chip color that at least one of matches the particular paint color and coordinates with the particular paint color.

12. The method of claim 8, wherein:
 the received input indicates a particular paint color;
 the computing device is further configured to:
 determine the particular paint color chip based on the particular paint color chip having a paint chip color that matches the particular paint color;
 determine at least one additional paint color chip location within the display assembly based on the particular paint color chip, the at least one additional paint color chip location corresponding to a location of a coordinating paint color chip having a coordinating paint chip color that coordinates with the paint chip color of the particular paint color chip;
 identify at least one additional LED of the plurality of LEDs, the at least one additional LED being associated with the at least one additional paint color chip location; and
 transmit an additional activation signal to the LED control circuit to activate the at least one additional LED; and
 the method further comprises:
 receiving, with the LED control circuit, the additional activation signal from the computing device; and
 activating, with the LED control circuit, the at least one additional LED to illuminate the divider tab located at the additional paint color chip location within the display assembly.

13. The method of claim 8, wherein the received input is generated by a paint color chip reader that is configured to obtain identifying indicia associated with the particular paint color chip.

14. The method of claim 8, wherein:
the received input indicates a particular paint color and the particular paint color chip has a paint chip color that matches the particular paint color;
the divider tab located at the particular paint color chip location is illuminated by the particular LED with a first LED color;
the computing device is further configured to transmit an additional activation signal to the LED control circuit to activate an additional LED and illuminate an additional divider tab located at an additional paint color chip location with a second LED color, the additional paint color chip location being associated with an additional paint color chip that has an additional paint chip color that coordinates with the paint chip color of the particular paint color chip; and
the method further comprises:
receiving, with the LED control circuit, the additional activation signal from the computing device; and
activating, with the LED control circuit, the additional LED to illuminate the additional divider tab located at the additional paint color chip location with the second LED color.

15. A system comprising:
a computing device in communication with a light-emitting diode (LED) control circuit, the LED control circuit being in communication with each LED of a plurality of LEDs of at least one LED array, each LED of the plurality of LEDs being associated with a respective paint color chip location of a plurality of paint color chip locations of a display assembly configured to display a plurality of paint color chips at the plurality of paint color chip locations, each paint color chip location having a divider tab, and each LED of the plurality of LEDs being configured to illuminate the divider tab at the respective paint color chip location,
the computing device being configured to:
determine a particular paint color chip of the plurality of paint color chips based on received input;
determine a particular paint color chip location within the display assembly associated with the particular paint color chip;
identify a particular LED of the plurality of LEDs associated with the particular paint color chip location; and
transmit an activation signal to the LED control circuit;
wherein the LED control circuit is configured to receive the activation signal from the computing device and activate the particular LED to illuminate the divider tab located at the particular paint color chip location within the display assembly.

16. The system of claim 15, wherein the computing device is included in a kiosk included in the display assembly.

17. The system of claim 15, wherein the computing device is one of a PC, a laptop, a tablet device, and a smartphone.

18. The system of claim 15, wherein the received input indicates a particular paint color and wherein the computing device is further configured to determine the particular paint color chip based on the particular paint color chip having a paint chip color that at least one of matches the particular paint color and coordinates with the particular paint color.

19. The system of claim 15, wherein the received input indicates a particular paint color and wherein the computing device is further configured to:
determine the particular paint color chip based on the particular paint color chip having a paint chip color that matches the particular paint color;
determine at least one additional paint color chip location within the display assembly based on the particular paint color chip, the at least one additional paint color chip location corresponding to a location of a coordinating paint color chip having a coordinating paint chip color that coordinates with the paint chip color of the particular paint color chip;
identify at least one additional LED of the plurality of LEDs, the at least one additional LED being associated with the at least one additional paint color chip location; and
transmit an additional activation signal to the LED control circuit to activate the at least one additional LED;
wherein the LED control circuit is configured to receive the additional activation signal from the computing device and activate the at least one additional LED to illuminate the divider tab located at the additional paint color chip location within the display assembly.

20. The system of claim 15, wherein the received input is generated by a paint color chip reader that is configured to obtain identifying indicia associated with the particular paint color chip.

21. The system of claim 15, wherein:
the received input indicates a particular paint color and the particular paint color chip has a paint chip color that matches the particular paint color;
the divider tab located at the particular paint color chip location is illuminated by the particular LED with a first LED color; and
the computing device is further configured to transmit an additional activation signal to the LED control circuit to activate an additional LED and illuminate an additional divider tab located at an additional paint color chip location with a second LED color, the additional paint color chip location being associated with an additional paint color chip that has an additional paint chip color that coordinates with the paint chip color of the particular paint color chip;
wherein the LED control circuit is configured to receive the additional activation signal from the computing device and activate the additional LED to illuminate the additional divider tab located at the additional paint color chip location with the second LED color.

22. A method comprising:
determining, with a computing device, a particular paint color chip of a plurality of paint color chips based on received input, the computing device being in communication with a light-emitting diode (LED) control circuit, the LED control circuit being in communication with each LED of a plurality of LEDs of at least one LED array, each LED of the plurality of LEDs being associated with a respective paint color chip location of a plurality of paint color chip locations of a display assembly configured to display the plurality of paint color chips at the plurality of paint color chip locations, each paint color chip location having a divider tab, and each LED of the plurality of LEDs being configured to illuminate the divider tab at the respective paint color chip location,
determining, with the computing device, a particular paint color chip location within the display assembly associated with the particular paint color chip;
identifying, with the computing device, a particular LED of the plurality of LEDs associated with the particular paint color chip location; and
transmitting, with the computing device, an activation signal to the LED control circuit;

wherein the LED control circuit is configured to receive the activation signal from the computing device and activate the particular LED to illuminate the divider tab located at the particular paint color chip location within the display assembly.

23. The method of claim 22, wherein the computing device is included in a kiosk included in the display assembly.

24. The method of claim 22, wherein the computing device is one of a PC, a laptop, a tablet device, and a smartphone.

25. The method of claim 22, wherein the received input indicates a particular paint color, the method further comprising:
   determining, with the computing device, the particular paint color chip based on the particular paint color chip having a paint chip color that at least one of matches the particular paint color and coordinates with the particular paint color.

26. The method of claim 22, wherein the received input indicates a particular paint color, the method further comprising:
   determining, with the computing device, the particular paint color chip based on the particular paint color chip having a paint chip color that matches the particular paint color;
   determining, with the computing device, at least one additional paint color chip location within the display assembly based on the particular paint color chip, the at least one additional paint color chip location corresponding to a location of a coordinating paint color chip having a coordinating paint chip color that coordinates with the paint chip color of the particular paint color chip;
   identifying, with the computing device, at least one additional LED of the plurality of LEDs, the at least one additional LED being associated with the at least one additional paint color chip location; and
   transmitting, with the computing device, an additional activation signal to the LED control circuit to activate the at least one additional LED;
   wherein the LED control circuit is configured to receive the additional activation signal from the computing device and activate the at least one additional LED to illuminate the divider tab located at the additional paint color chip location within the display assembly.

27. The method of claim 22, wherein the received input is generated by a paint color chip reader that is configured to obtain identifying indicia associated with the particular paint color chip.

28. The method of claim 22, wherein:
   the received input indicates a particular paint color and the particular paint color chip has a paint chip color that matches the particular paint color;
   the divider tab located at the particular paint color chip location is illuminated by the particular LED with a first LED color; and
   the method further comprises transmitting, with the computing device, an additional activation signal to the LED control circuit to activate an additional LED and illuminate an additional divider tab located at an additional paint color chip location with a second LED color, the additional paint color chip location being associated with an additional paint color chip that has an additional paint chip color that coordinates with the paint chip color of the particular paint color chip;
   wherein the LED control circuit is configured to receive the additional activation signal from the computing device and activate the additional LED to illuminate the additional divider tab located at the additional paint color chip location with the second LED color.

\* \* \* \* \*